United States Patent
Vallana et al.

(10) Patent No.: US 12,371,334 B2
(45) Date of Patent: Jul. 29, 2025

(54) METHODS OF REDUCING DINITROGEN

(71) Applicant: MONASH UNIVERSITY, Clayton (AU)

(72) Inventors: Federico M. Ferrero Vallana, Clayton (AU); Douglas R. MacFarlane, Clayton (AU); Alexandr Nikolaevich Simonov, Clayton (AU)

(73) Assignee: MONASH UNIVERSITY, Clayton (AU)

( * ) Notice: Subject to any disclaimer, the term of this patent is extended or adjusted under 35 U.S.C. 154(b) by 621 days.

(21) Appl. No.: 17/775,417

(22) PCT Filed: Dec. 3, 2020

(86) PCT No.: PCT/AU2020/051317
§ 371 (c)(1),
(2) Date: May 9, 2022

(87) PCT Pub. No.: WO2021/108859
PCT Pub. Date: Jun. 10, 2021

(65) Prior Publication Data
US 2022/0396491 A1 Dec. 15, 2022

(30) Foreign Application Priority Data
Dec. 3, 2019 (AU) .................... 2019904572

(51) Int. Cl.
*C01C 1/26* (2006.01)
*C01B 21/083* (2006.01)
(Continued)

(52) U.S. Cl.
CPC .......... *C01C 1/026* (2013.01); *C01B 21/0832* (2013.01); *C01B 21/091* (2013.01);
(Continued)

(58) Field of Classification Search
CPC ..... C01C 1/026; C25B 11/089; C25B 15/081; C25B 15/083; C25B 1/26; C25B 1/27;
(Continued)

(56) References Cited

U.S. PATENT DOCUMENTS 3,975,501 A * 8/1976 Gordon ............... C01B 21/09
423/466
4,049,609 A * 9/1977 Aguirre ............ C08F 299/0414
525/49
(Continued)

OTHER PUBLICATIONS

International Search Report for corresponding application PCT/AU2020/051317 dated Jan. 21, 2021.
(Continued)

*Primary Examiner* — Paul A Wartalowicz
*Assistant Examiner* — Slone Elizabeth Simkins
(74) *Attorney, Agent, or Firm* — Norris McLaughlin, PA

(57) ABSTRACT

The invention provides a method of reducing dinitrogen to produce at least one haloamine compound, the method comprising: contacting a cathode comprising a dinitrogen-activating electrocatalytic composition with an electrolyte; providing dinitrogen, a reducible source of halogen and a source of hydrogen for reaction at the cathode; and applying a potential at the cathode sufficient to reduce the dinitrogen on the dinitrogen-activating electrocatalytic composition in the presence of the reducible source of halogen and the source of hydrogen, thereby producing at least one haloamine compound.

22 Claims, 8 Drawing Sheets

(51) Int. Cl.
*C01B 21/09* (2006.01)
*C01C 1/02* (2006.01)
*C25B 1/26* (2006.01)
*C25B 11/081* (2021.01)
*C25B 11/089* (2021.01)
*C25B 15/08* (2006.01)

(52) U.S. Cl.
CPC .............. *C25B 1/26* (2013.01); *C25B 11/081* (2021.01); *C25B 11/089* (2021.01); *C25B 15/081* (2021.01); *C25B 15/083* (2021.01)

(58) Field of Classification Search
CPC .............. C01B 21/0832; C01B 21/091; C01B 2203/068; C01B 21/09
See application file for complete search history.

(56) References Cited

U.S. PATENT DOCUMENTS

2008/0181815 A1   7/2008   Cheng et al.
2020/0172398 A1*  6/2020   Launay ................. C02F 1/4674

OTHER PUBLICATIONS

International Preliminary Report on Patentability for corresponding application PCT/AU2020/051317 dated Oct. 1, 2021.

AU Article 15 Search Report for corresponding application AU 2019904572 dated May 8, 2020.

Ke Wang, et al: "Electron-driven heterogeneous catalytic synthesis of ammonia: Current states and perspective", Carbon Resources Conversion 1 (2018), p. 2-31.[D1].

Haiyan Wang, Yuzhuo, et al.: "Selective Electrochemical Reduction of Nitrogen to Ammonia by Adjusting the Three-Phase Interface", AAAS Research, vol. 2019, Nov. 30, 2019, p. 1-12. [D2].

Jun Wang et al:"Ambient ammonia synthesis via palladium catalyzed electrohydrogenation of dinitrogen at low overpotential", Nature Communications (2018) 9:1795, p. 1-7. [D3].

Na Cao, et al: Aqueous electrocatalytic N2 reduction under ambient conditions Nano Research (2018), 11(6), p. 2992-3008. [D4].

Xin (Cindy) Huang: "Reactions between Aqueous Chlorine and Ammonia: A Predictive Model", The Department of Civil and Environmental Engineering, Doctoral Dissertation, Civil Engineering, Northeastern University, Boston, Massachusetts, Jul. 2008, p. 1-171. Available on the internet at: https://repository.library.northeastern.edu/filesheu:817 Downloaded on Jul. 5, 2020 [D6].

R. L. Jolley, J. H. Carpenter: "Aqueous Chemistry of Chlorine: Chemistry, Analysis, and Environmental Fate of Reactive Oxidant Species" Contract No. W-7405-eng-26, Chemical Technology Division, Jan. 1982, Oak Ridge National Laboratory, Oak Ridge, Tennessee 37830, Union Carbide Corporation for the Department of Energy, p. 1-128. Available in the internet at: https://www.osti.gov/servlets/purl/5505533. Downloaded on Jul. 5, 2020 [D7].

* cited by examiner

METHODS OF REDUCING DINITROGEN

This is an application filed under 35 USC 371 based on PCT/AU2020/051317, filed Dec. 3, 2020 which claimed priority to AU 2019904572 filed Dec. 3, 2019. The present application claims the full priority benefit of all prior applications and incorporates by reference their full disclosures as if set forth herein.

TECHNICAL FIELD

The invention relates to an electrochemical method of reducing dinitrogen to produce at least one haloamine compound. The method comprises contacting a cathode comprising a dinitrogen-activating electrocatalytic composition with an electrolyte and applying a potential at the cathode sufficient to reduce the dinitrogen on the dinitrogen-activating electrocatalytic composition in the presence of a reducible source of halogen and a source of hydrogen, thereby producing at least one haloamine compound. The invention also relates to a method of producing ammonia or an ammonium salt from dinitrogen, in which an electrochemically produced haloamine intermediate is converted to ammonia or an ammonium salt.

BACKGROUND OF INVENTION

Providing food and energy sufficient to meet the requirements of a burgeoning world population remains an ongoing challenge for humanity. New technologies for dinitrogen ($N_2$) fixation to form ammonia ($NH_3$) and other reduced nitrogen compounds offer potential solutions to both of these challenges: synthetic ammonia-based fertilizers are already critical to global food production and the high energy density of $NH_3$ provides a significant prospect for its use as a transportable fuel or carrier of renewable energy.

The invention of the Haber-Bosch process in the $20^{th}$ century provided for the first time an industrial route to produce large volumes of synthetic ammonia. However, due to the exceptional stability of the dinitrogen triple bond (N≡N, 942 kJ mol$^{-1}$), the Haber-Bosch process requires extreme reaction conditions of elevated pressure (150-350 atm) and temperature (400-550° C.), as well as a supply of pure $H_2$ which is typically sourced from the steam reforming process of natural gas. Consequently, the process consumes approximately 2% of global energy supply and contributes ~1.5% of global greenhouse gas emissions. Technologies for $N_2$ conversion to $NH_3$ or alternative reduced nitrogen compounds which can be powered by renewable resources are thus urgently needed.

The development of a successful electrochemical dinitrogen reduction reaction to directly produce ammonia, a process known as NRR, would enable the direct conversion of electricity into $NH_3$ in a simple electrolytic cell. The cathodic half-reaction of the NRR is shown in equation (1):

$$N_2 + 6H^+ + 6e^- \rightarrow 2NH_3 \quad (1)$$

Instead of relying on steam reformed $H_2$, the protons required for NRR can be supplied by anodic oxidation of water (the oxygen evolution reaction) or of $H_2$ generated from sustainable water-splitting processes. A wide range of dinitrogen-activating electrocatalysts, typically employing a metallic transition metal active phase, have now been reported. Unfortunately, the 6e$^-$ and 6H$^+$ NRR is kinetically sluggish and thus electrochemically disadvantaged over the more facile 2e$^-$ and 2H$^+$ hydrogen evolution reaction (HER) shown in equation (2).

$$2H^+ + 2e^- \rightarrow H_2 \quad (2)$$

Moreover, the NRR reaction products ammonia or hydrazine have a high affinity for coordination to the transition-metal based electrocatalysts on which they are produced. The resulting blocking of active catalytic sites by these species is believed to be a further contributing factor to poor efficiency in the NRR.

As a result of competition from the HER and/or catalytic site blocking, many reported electrocatalysts for NRR suffer both from very low faradaic efficiency and/or low $NH_3$ yield rates when evaluated in aqueous electrolytes. Moreover, some reports of high faradaic efficiencies are regarded with scepticism by those skilled in the art (absent evidence of high ammonia yield rates over extended periods of time) due to residual nitrogen contaminants in the catalysts, particularly when ammonium salt precursors were used (see e.g. Ozin, "Nitrogen Reduction Reactions: Fact or Artifact", *Advanced Science News* 2018, March 2018).

Haloamines, and particularly chloramines, are another class of commercially important reduced nitrogen compounds. The chloramine family of compounds includes $NCl_3$, $NHCl_2$ and $NH_2Cl$. In the presence of HOCl or OCl$^-$ in aqueous solutions, these compounds are in equilibrium with one another and their speciation is dependent on the pH of the solution. The chloramines find application in water disinfection and as fertilisers. However, these compounds are typically made from Haber Bosch produced ammonia and therefore there is an unmet need for a means of making these compounds directly from dinitrogen and renewable energy.

Since haloamines and in particular chloramines can be converted to ammonia and ammonium compounds by previously disclosed processes, a means of making these haloamine compounds directly from dinitrogen would provide an alternative route to the production of ammonia or ammonium compounds from dinitrogen.

There is therefore an ongoing need for new approaches to reduce dinitrogen to form reduced nitrogen compounds including haloamines and ammonia, which at least partially address one or more of the above-mentioned short-comings or provide a useful alternative process.

A reference herein to a patent document or other matter which is given as prior art is not to be taken as an admission that the document or matter was known or that the information it contains was part of the common general knowledge as at the priority date of any of the claims.

SUMMARY OF INVENTION

The inventors have surprisingly found that dinitrogen can be electrochemically reduced to form haloamine compounds with cathodes comprising dinitrogen-activating electrocatalytic compositions, for example those typically used for the NRR reaction, provided that a reducible source of halogen is also available for co-reduction in the cathodic reaction zone together with a source of hydrogen. This reaction may be termed the "electrocatalytic nitrogen fixation reaction" (eNFR) to distinguish it from the conventional NRR.

In accordance with a first aspect the invention provides a method of reducing dinitrogen to produce at least one haloamine compound, the method comprising: contacting a cathode comprising a dinitrogen-activating electrocatalytic composition with an electrolyte; providing dinitrogen, a reducible source of halogen and a source of hydrogen for reaction at the cathode; and applying a potential at the cathode sufficient to reduce the dinitrogen on the dinitrogen-activating electrocatalytic composition in the presence of the reducible source of halogen and the source of hydrogen, thereby producing at least one haloamine compound.

In some embodiments, the reducible source of halogen and the source of hydrogen are provided in the electrolyte for reaction at the cathode.

In some embodiments, the halogen is chlorine and the at least one haloamine compound comprises at least one selected from the group consisting of $NCl_3$, $NHCl_2$ and $NH_2Cl$.

In some embodiments, the reducible source of halogen comprises at least one selected from the group consisting of hypochlorite anion ($OCl^-$), hypochlorous acid (HOCl) and dichlorine ($Cl_2$). The reducible source of halogen may comprise HOCl.

In some embodiments, the potential is in the range of +250 mV to −500 mV relative to the reversible hydrogen electrode (RHE), or +150 to −300 mV relative to the to the RHE, such as +100 to −200 mV relative to the RHE.

In some embodiments, the reducible source of halogen is dissolved in the electrolyte at a concentration of at least $1\times10^{-5}$ mol/litre, such at a concentration of at least $1\times10^{-4}$ mol/litre.

In some embodiments, the source of hydrogen comprises $H^+$ or $H_2O$.

In some embodiments, the electrolyte is an acidic aqueous electrolyte. The acidic aqueous electrolyte may have a pH of below 2, such as below 1.

In some embodiments, the electrolyte comprises a solution of halide, such as hydrogen halide (HX, where X=halogen), for example hydrochloric acid. The halide concentration may be at least 0.05 mol/litre, such as at least 0.5 mol/litre.

In some embodiments, the method further comprises producing the reducible source of halogen by oxidising a halide anion in the electrolyte at an anode, wherein the reducible source of halogen is transported in the electrolyte from the anode for reaction with the reduced dinitrogen. To facilitate this, the cathode and anode may not be separated by a separator.

The halide anion may be oxidised at the anode to produce the reducible source of halogen with a faradaic efficiency of at least 20%, or at least 50%, such as at least 75%.

In some embodiments, the anode comprises at least one selected from the group consisting of platinum, platinum-iridium alloys, platinized titanium, mixed metal oxide clad titanium anodes, manganese dioxide, ferrosilicon and graphite.

In some embodiments, the method further comprises introducing an external feed to an electrochemical cell comprising the cathode, wherein the external feed comprises at least a portion of the reducible source of halogen provided for reaction at the cathode.

In some embodiments, the dinitrogen-activating electrocatalytic composition comprises a metallic composition. The metallic composition may comprise at least one metal selected from the group consisting of ruthenium, iron, rhodium, iridium, molybdenum, chromium, tungsten, cobalt, bismuth and nickel. In some embodiments, the metallic composition comprises at least one selected from the group consisting of ruthenium, rhodium and iridium. In some embodiments, the metallic composition comprises ruthenium.

The metallic composition may be in the form of micro- and/or nanoparticles. The metallic composition may be dispersed on a porous conductive support material which forms at least a part of the cathode.

In some embodiments, the method further comprises dissolving the dinitrogen in the electrolyte by contacting the electrolyte with dinitrogen gas at a partial pressure of between 0.7 bar and 100 bar, such as between 1 bar and 30 bar, or between 1 bar and 12 bar.

In some embodiments, the dinitrogen is converted to the at least one haloamine compound with a faradaic efficiency of at least 40%, or at least 50%, such as at least 60%.

In some embodiments, the method further comprises recovering a product composition comprising the at least one haloamine compound from a reaction zone of an electrochemical cell in which the haloamine was produced.

In some embodiments where the product composition is an acidic aqueous composition and the haloamine compound is a chloramine compound, the method further comprises neutralising or diluting the acidic aqueous composition to increase a concentration of $NH_2Cl$ therein.

In some embodiments, the method further comprises concentrating the product composition to produce a concentrated composition of haloamine compound.

In some embodiments where the product composition is an aqueous composition, the method further comprises extracting the haloamine compound from the aqueous composition into a non-aqueous solvent.

In some embodiments, the method further comprises separating the haloamine compound from the electrolyte by partitioning the haloamine compound into a gas phase.

In some embodiments, the method further comprises converting the at least one haloamine compound to ammonia ($NH_3$) or ammonium cation ($NH_4^+$).

The converting may comprise hydrolysing the haloamine with an acid and removing a reducible source of halogen produced as a by-product of the hydrolysing. The reducible source of halogen produced as a by-product of the hydrolysing may be recovered and recycled for reaction with reduced dinitrogen at the cathode. In some embodiments, (i) the haloamine compound is hydrolysed in the presence of a source of sulfate or phosphate, or (ii) an ammonium salt product of hydrolysing the haloamine compound is contacted with a source of sulfate or phosphate, thereby forming ammonium sulphate or ammonium dihydrogen phosphate.

In accordance with a second aspect the invention provides a method of producing ammonia or an ammonium salt from dinitrogen, the method comprising: contacting a cathode comprising a dinitrogen-activating electrocatalytic composition with an electrolyte; providing dinitrogen, a reducible source of halogen and a source of hydrogen for reaction at the cathode; applying a potential at the cathode sufficient to reduce the dinitrogen on the dinitrogen-activating electrocatalytic composition in the presence of the reducible source of halogen and the source of hydrogen, thereby producing at least one haloamine compound; and converting the at least one haloamine compound to ammonia or an ammonium salt.

Features of the first aspect disclosed herein are generally applicable also to the second aspect of the invention.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
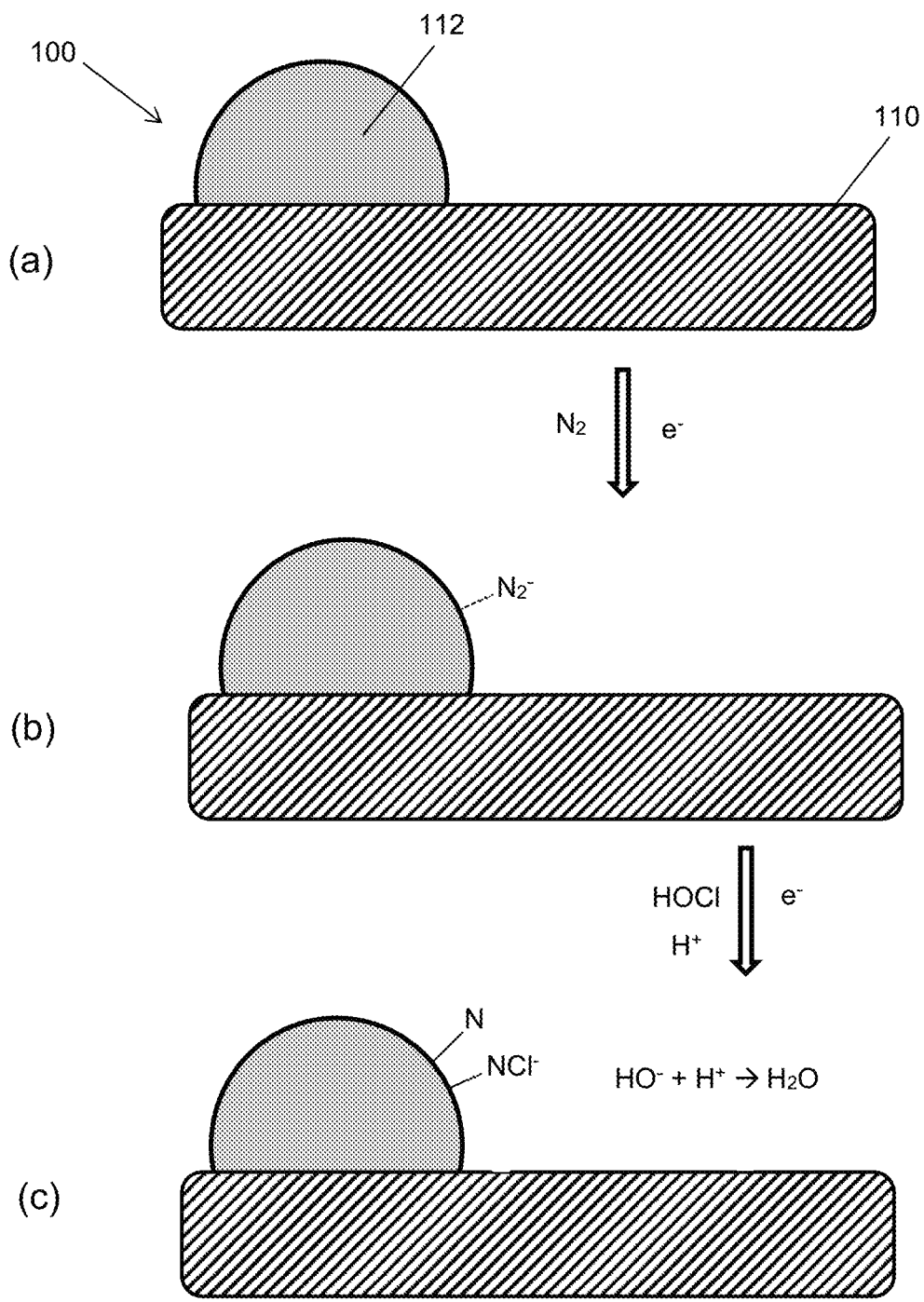
FIG. 1 schematically depicts part of a possible reaction mechanism for dinitrogen reduction on a cathodic electrocatalytic composition in the presence of HOCl and H$^+$ to form chloramine.

Method of Reducing Dinitrogen to Produce at Least One Haloamine Compound

The present invention relates to a method of reducing dinitrogen to produce at least one haloamine compound. The method comprises contacting a cathode comprising a dinitrogen-activating electrocatalytic composition with an electrolyte, and providing dinitrogen (N$_2$), a reducible source of halogen and a source of hydrogen for reaction at the cathode. A potential is applied at the cathode which is sufficient to reduce the dinitrogen on the dinitrogen-activating electrocatalytic composition in the presence of the reducible sources of halogen and hydrogen, thereby producing at least one haloamine compound.

As used herein, a haloamine compound refers to an inorganic haloamine compound having the formula NH$_y$X$_{3-y}$, where X is a halogen and y is selected from 0, 1 or 2. Mixtures of these haloamine compounds may also be expressed as NH$_y$X$_{3-y}$, where y corresponds to the average stoichiometry of the mixture.

The halogen may be selected from chlorine, bromine and iodine, and in some embodiments is chlorine. The reducible source of chlorine may thus be hypochlorous acid (HOCl), hypochlorite anion (OCl$^-$) or Cl$_2$. It will be appreciated that these species are interrelated in water-containing electrolytes since Cl$_2$ dissolves in aqueous solutions to produce HOCl, and HOCl dissociates to OCl$^-$ with the dissociation equilibrium governed by the pH of the solution. Accordingly, the speciation of the reducible source of chlorine may depend on the nature and properties of the electrolyte.

Without wishing to be bound by any theory, one proposal for the electrocatalytic reaction taking place on the cathode is shown in equation (3) shown below:

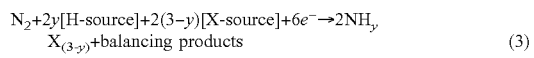

$$N_2 + 2y[\text{H-source}] + 2(3-y)[\text{X-source}] + 6e^- \rightarrow 2NH_yX_{(3-y)} + \text{balancing products} \quad (3)$$

where [H-source] is the source of hydrogen, [X-source] is the reducible source of halogen, X is the corresponding halogen, y is selected from 0, 1 or 2, and the balancing products are the residues of the reducible sources of hydrogen and halogen.

For the specific case where H$^+$ and HOCl are the reducible sources of hydrogen and halogen respectively (e.g. in low pH electrolytes), this electrocatalytic reaction is as shown in equation (4).

$$N_2 + 2yH^+ + 2(3-y)HOCl + 6e^- \rightarrow 2NH_yCl_{(3-y)} + 2(3-y)OH^- \quad (4)$$

The OH$^-$ will immediately react with H$^+$ in the electrolyte according to equation (5), so that the overall cathodic half-reaction (6) is given by the combination of equations (4) and (5).

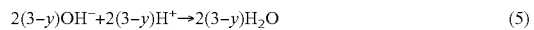

$$2(3-y)OH^- + 2(3-y)H^+ \rightarrow 2(3-y)H_2O \quad (5)$$

$$N_2 + 6H^+ + 2(3-y)HOCl + 6e^- \rightarrow 2NH_yCl_{(3-y)} + 2(3-y)H_2O \quad (6)$$

In this proposal, an activated nitrogen species bound at an electrocatalytic site reacts with HOCl (or other reducible source of chlorine) to form an N—Cl bond and release OH$^-$ (or other corresponding by-product). At least one N—Cl bond in the ultimate chloramine product is thus formed catalytically on the electrocatalyst composition by a reaction involving the reducible source of chlorine.

Such a proposed mode of reaction is shown in FIG. 1, which schematically depicts a sequence of hypothetical reactions on cathode 100. As seen in FIG. 1(*a*), cathode 100 comprises a conductive substrate 110 with metallic (e.g. Ru) clusters 112 formed thereon. Under electrocatalytic reaction conditions, cathode 100 is contacted with an electrolyte comprising dinitrogen, HOCl as the reducible source of halogen and H$^+$ as the source of hydrogen, and a reduction potential is applied to the cathode. As seen in FIG. 1(b), dinitrogen binds reversibly to the metallic cluster and one or more electrons transfer from the negatively charged cathode to the dinitrogen molecule to form a M-$N_2^-$ species.

Such a negatively charged N-species is a very strong base and may react with HOCl molecules that are present near the surface to generate surface N—Cl species, for example as seen in FIG. 1(c) and/or according to equation (7):

$$M\text{-}N_2^- + HOCl \rightarrow M\text{-}N{=}N\text{—}Cl + OH^- \qquad (7)$$

Continued electron transfer into the bound molecule and further reaction with HOCl eventually leads to the release of a first, followed by a second $NCl_3$ molecule. Alternatively, depending on the reaction conditions, some of the steps may involve $H^+$ attachment so that $NHCl_2$ or $NH_2Cl$ become the primary reaction products.

It should be appreciated that general equation (3), and the specific embodiments thereof shown in equations (4)-(6) and discussed with reference to FIG. 1, represent only one possible type of reaction mechanism that may be in operation. The invention is not considered to be limited by the specific sequence of primary reactions leading to the haloamine formation, or whether those reactions occur at active sites on the electrocatalyst or in the electrolyte surrounding the cathode. These aspects may depend on the speciation of the reducible source of halogen, the nature of the electrolyte and the reaction mechanism following initial activation of the dinitrogen molecule on the electrocatalytic site.

For example, according to another possible mechanism, the species which react initially with the reducing dinitrogen molecule are all $H^+$ (or other source of hydrogen). The primary product that forms on the surface of the electrocatalytic composition is thus $NH_3$ (or $NH_4^+$), i.e. according to the NRR as shown in equation (1). Such a bound $NH_3$ product might be expected to form in the absence of the HOCl (or other reducible source of halogen). However, the inventors have shown that the yield of $NH_3$ produced is much lower under these conditions. Therefore, in such a pathway the role of HOCl is to react with the primary $NH_3$ (or $NH_4^+$), either while still bound to the electrocatalytic composition or in solution near the cathode with the low, equilibrium amount of $NH_4^+$ released from the cathode, to form chloramine species. By constantly reacting with the $NH_3$ or $NH_4^+$ in such a way, the HOCl present at the cathode serves to increase the overall rate of reduction enormously.

High reaction rates may be obtained in the eNFR reaction, for example significantly higher than can be obtained in the NRR reaction with the same electrocatalytic composition (i.e. when the reducible source of halogen is absent). The inventors have achieved unoptimized reaction rates (normalised to the electrode surface area) of close to $1\times10^{-8}$ mol·cm$^{-2}$·s$^{-1}$. Without wishing to be bound by any theory, the inventors believe that the advantageous activity in eNFR may at least in part be related to the weaker binding affinity of haloamines on the catalytic sites compared to ammonia. This enables the haloamine product to readily desorb from the catalyst surface allowing rapid turnover of catalytic sites and thereby high rates of reaction.

One advantage of the fast eNFR kinetics is that the reaction can be conducted at potentials close to, or more positive than, the Reversible Hydrogen Electrode (RHE) potential. This has the effect of limiting the rate of the competing HER reaction rate per equation (2) and therefore allowing the selectivity (also known as the faradaic efficiency) of the eNFR process to be high. The rate of proton-reduction reactions, and particularly those resulting in $H_2$ formation, is suppressed due to the applied potential offering no more than a small overpotential for this reaction.

The reducible source of halogen may be supplied for reduction at the cathode in several ways. In some embodiments, it is at least partially produced in situ in the electrolyte by oxidising the corresponding halide anion at the anode of the electrochemical cell. Where the halogen is chlorine, such reactions are previously reported, for example in the context of the Chloralkali process, and may be represented by equations (8)-(10):

$$\text{Chloride oxidation: } 2Cl^- \rightarrow Cl_2 + 2e^- \qquad (8)$$

$$\text{Chlorine hydrolysis: } Cl_2 + H_2O \rightarrow HOCl + Cl^- + H^+ \qquad (9)$$

$$\text{Overall anodic reaction: } 3H_2O + 3Cl^- \rightarrow 3HOCl + 3H^+ + 6e^- \qquad (10)$$

The overall cell reaction from the cathodic and anodic half-reactions, derived from the combination of equations (6) and (10), is thus given by equation (11):

$$N_2 + (3-2y)HOCl + 3Cl^- + 3H^+ \rightarrow 2NH_yCl_{3-y} + (3-2y)H_2O \qquad (11)$$

To produce chloroamine with y>1.5, the reaction thus requires additional HOCl to be provided. For y<1.5, the negative stochiometric coefficient for HOCl indicates that HOCl is a product of the reaction. For y=1.5 the HOCl produced at the anode is entirely consumed at the cathode. The practical application of these variations are described in the following paragraphs.

Where the anode reaction is the only source of reducible halogen and this is entirely consumed at the electrode, the idealised stoichiometry of the overall reaction (assuming 100% faradaic efficiency at the anode) can thus be expressed according to equation (12):

$$N_2 + 3Cl^- + 3H^+ \rightarrow 2NH_{1.5}Cl_{1.5} \qquad (12)$$

where the $NH_{1.5}Cl_{1.5}$ species indicates a mixture of the chloramines $NCl_3$, $NHCl_2$ or $NH_2Cl$, that depends on pH and other conditions, having overall stoichiometry being $NH_{1.5}Cl_{1.5}$.

Alternatively, additional HOCl may be provided for reaction at the cathode to supplement that produced at the anode, so that the stoichiometry is not limited by the anode reaction. Such HOCl may optionally be produced in a looping process that converts the chloramine products into ammonia or ammonium salts with HOCl by-product, as will be described in greater detail hereafter. In this manner, it is believed that the $NH_yCl_{3-y}$ produced according to equation (11) can have increased chloride content, i.e. y<1.5).

An embodiment of the invention where the anode reaction is the only source of reducible halogen will now be described with reference to FIG. 2. Cell 200 includes cathode 210, comprising a conductive substrate with a metallic electrocatalytic composition (for example Ru clusters) disposed thereon, in cell chamber 211. Cell 200 further comprises anode 212, which may be a Pt wire, and reference electrode 213 of conventional type, such as SCE. The three electrodes are immersed in the same electrolyte 214, and cathode 210 and anode 212 are not separated by a separator. Optionally, a stirrer or other means for mixing or circulating the electrolyte may be included to provide good mass transport in cell chamber 211. The electrodes are connected to a power source (not shown) capable of applying a potential difference between cathode 210 and anode 212, with the reduction potential of the cathode controlled relative to the reference electrode.

Electrolyte 214 comprises a source of hydrogen and a halide anion. The electrolyte may be an aqueous HCl solution, so that the source of hydrogen is $H^+$ and the halide anion is chloride ($Cl^-$).

Cell 200 further comprises gas inlet 215 to introduce dinitrogen 218 to chamber 211. Optionally, the cell includes gas outlet 216 for removing gas 219 from the headspace of the chamber, so that a bubbling flow of $N_2$ into electrolyte 214 is provided near to cathode 210. Optionally the cell includes electrolyte inlet 220 for replenishing the electrolyte, and electrolyte outlet 221 for withdrawing electrolyte.

In use, dinitrogen 218 is bubbled through (or pressurised into) chamber 211 via feed inlet 215, and a reduction potential, for example in the range of +250 mV to −500 mV relative to the reversible hydrogen electrode (RHE), is applied at cathode 210. The resulting oxidation potential at anode 212 causes oxidation of the halide anion. In the case of chloride, the oxidation forms chlorine ($Cl_2$) via equation (8). In acidic aqueous electrolytes the chlorine is immediately hydrolysed to form HOCl via equation (9). It is preferred that the anode reaction is strongly selective towards $Cl^-$ oxidation. Thermodynamically, water oxidation is slightly favoured over $Cl^-$ oxidation, however, the former is kinetically sluggish on many electrode materials. Accordingly, anodic electrocatalysts known in the art to strongly favour the chloride oxidation reaction are preferred. The selectivity towards chloride oxidation is also favoured at low pH and at high chloride ion concentration. In some embodiments, the faradaic efficiency for halide oxidation at the anode is at least 20%, or at least 50%, or at least 75%.

The HOCl produced at anode 212 is transported across chamber 211 in electrolyte 214 for reaction at cathode 210. The mass transfer may be by diffusion or may be assisted by mixing of the electrolyte in the cell. Notably, because cathode 210 and anode 212 are not separated by a separator which is impermeable to HOCl, the HOCl is able to pass freely to the cathode for reduction. By contrast, in conventional arrangements for NRR reaction, a separator is generally used between cathodic and anodic reaction chambers to prevent transmission of anodic oxidation products to the cathode, since such oxidation products have been considered likely to undesirably interfere with nitrogen reduction at the cathode.

At cathode 210 and/or in surrounding electrolyte 214, dinitrogen 218, the source of hydrogen (e.g. $H^+$) and the reducible source of halogen (e.g. HOCl) are reduced to form chloramine products as discussed above. In the case where the electrolyte is an aqueous HCl solution, the overall cell reaction may be given by equation (12).

Since electrolyte components (i.e. HCl) are consumed in the reaction, fresh electrolyte 222 (or HCl gas) may be added continuously or periodically to chamber 211 via electrolyte inlet 220 to replenish electrolyte 214. Electrolyte 214 containing chloramine product may be withdrawn continuously or periodically from cell chamber 211 via electrolyte outlet 221 as product stream 223. In this way, cell 200 may be operated continuously. In other embodiments, cell 200 may be operated to favour haloamine partitioning into the gaseous headspace of the chamber. Thus, the haloamine product may be recovered at least in part by withdrawing gas 219 from the cell.

In some embodiments, the reducible source of halogen supplied for reduction at the cathode is at least partially, and optionally entirely, provided by introducing an external feed stream comprising the reducible source of halogen to a cathodic reaction zone where dinitrogen reduction takes place on the cathode. In such embodiments, it is not required that the reducible source of halogen is provided at the cell's anode, although the source of hydrogen may still be produced or replenished at the anode.

Figure 3:
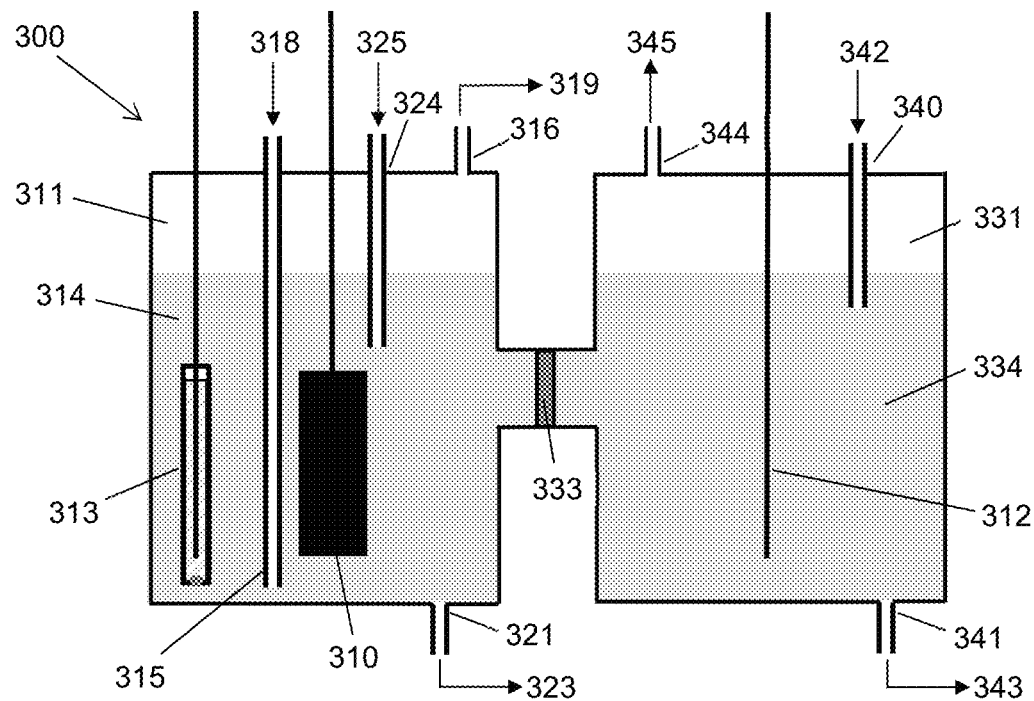
FIG. 3 schematically depicts a separated electrochemical cell for reducing dinitrogen to form haloamines according to other embodiments of the invention.

Such an embodiment of the invention will now be described with reference to FIG. 3. Cell 300 includes cathodic chamber 311 and anodic chamber 331, which are separated by proton-permeable separator 333, for example a membrane made of a sulfonated poly(tetrafluorethylene) ionomer such as Nafion. Cathode 310, comprising a conductive substrate with a metallic electrocatalytic composition (for example Ru clusters) disposed thereon, is disposed in cathodic chamber 311. Reference electrode 313 of conventional type, such as SCE, is also in the cathodic chamber. Anode 312, which may be a conventional anode for water oxidation, is disposed in anodic chamber 331. The electrodes are connected to a power source (not shown) capable of applying a potential difference between cathode 310 and anode 312, with the reduction potential of the cathode controlled relative to the reference electrode.

Cathode 310 and reference electrode 313 are immersed in cathodic electrolyte 314, while anode 312 is immersed in anodic electrolyte 334. Electrolytes 314 and 334 are not required to be the same as they are separated by separator 333 which inhibits or substantially prevents the transmission of species other than protons between the cathodic and anodic reaction chambers. Cathodic electrolyte 314 comprises a source of hydrogen. The cathodic electrolyte may be an aqueous acidic solution, so that the source of hydrogen is $H^+$.

Cell 300 further comprises $N_2$ feed inlet 315 to introduce dinitrogen 318 to cathodic chamber 311. Optionally, the cell includes cathodic gas outlet 316 for removing gas 319 from the headspace of the cathodic chamber, so that a bubbling flow of $N_2$ into electrolyte 314 is provided near to cathode 310. Cell 300 also includes halogen feed inlet 324 for introducing external feed stream 325 which includes a reducible source of halogen, optionally dissolved in a replenishing stream of electrolyte. Optionally cathodic electrolyte outlet 321 is provided for withdrawing cathodic electrolyte.

Cell 300 may comprise anodic inlet 340 for introducing or replenishing anodic electrolyte 334, and optionally also to introduce one or more gases to anodic chamber 331 (e.g. $H_2$). Optionally anodic electrolyte outlet 341 is provided for withdrawing anodic electrolyte, and anodic gas outlet 344 is provided for withdrawing gases 345 from the anodic chamber headspace.

In use, dinitrogen 318 is bubbled through (or pressurised into) cathodic chamber 311 via $N_2$ feed inlet 315. A reducible source of halogen, for example HOCl, is either initially present in electrolyte 314 or fed to the cathodic chamber in external feed stream 325 via halogen feed inlet 324. A reduction potential, for example in the range of +250 mV to −500 mV relative to the reversible hydrogen electrode (RHE), is applied at cathode 310. At cathode 310 and/or in cathodic electrolyte 314, dinitrogen 318, the source of hydrogen (e.g. $H^+$) and the reducible source of halogen (e.g. HOCl) are reduced to form chloramine products as discussed above. The source of hydrogen is replenished in electrolyte 314 to maintain charge neutrality by transmission of $H^+$ from anodic chamber 331 via proton-permeable membrane 333. The cathodic half-reaction may thus be given by equation (6).

The reducible source of halogen and fresh electrolyte may be fed continuously or periodically to the cathodic chamber via halogen feed inlet 324, while electrolyte 314 containing chloramine product may be withdrawn continuously or periodically from cathodic chamber 311 via cathodic electrolyte outlet 321 as product stream 323. In this way, cell 300 can be operated continuously. In other embodiments, cell 300 may be operated to favour haloamine partitioning into the gaseous headspace of cathodic chamber 311. Thus, the haloamine product may be recovered at least in part by withdrawing gas 319 from the cell.

In anodic chamber 331, the oxidation potential at anode 312 results in an oxidation reaction in anodic electrolyte 334. The oxidation reaction is not considered particularly limited, provided that it maintains overall charge neutrality in cell 300. In some embodiments, the anodic oxidation reaction is the oxygen evolution reaction given (in acidic electrolytes) by equation (13):

$$\text{Oxygen evolution reaction: } 2H_2O \rightarrow O_2 + 4H^+ + 4e^- \quad (13)$$

The resulting oxygen gas is prevented or substantially inhibited from permeating to the cathodic chamber by separator 333. However, H$^+$ produced at the anode transports though the separator to replenish the H$^+$ consumed in the cathodic chamber and thus maintain charge neutrality.

In other embodiments, the anodic reaction involves oxidation of halide anion present in the anodic electrolyte, for example according to equation (10). The resultant reducible source of halogen is optionally withdrawn and conveyed externally for introduction to the cathodic chamber as part of stream 325. In some embodiments, H$_2$ gas (for example by-product H$_2$ produced in the cathodic chamber) is fed to the anodic chamber for oxidation to H$^+$.

Haloamines

The methods of the invention produce at least one inorganic haloamine compound. Individual haloamine molecules generally have the formula NH$_y$X$_{3-y}$, where X is a halogen and y is selected from 0, 1 or 2.

In some embodiments, the halogen is selected from the group consisting of chlorine, bromine and iodine. The chemistry of the chloramines, bromoamines and iodoamines is typically analogous. For example, the conventional synthesis of these compounds is from ammonia and alkali hypohalogenite salts (1, 2 or 3 equivalents) according to the equations (14)-(16):

$$NH_3 + XO^- \rightarrow NH_2X + OH^- \quad (14)$$

$$NH_2X + XO^- \rightarrow NHX_2 + OH^- \quad (15)$$

$$NHX_2 + XO^- \rightarrow NX_3 + OH^- \quad (16)$$

where X=Cl, Br or I.

The chloramines, bromoamines and iodoamines are reported to undergo hydrolysis in the presence of strong acid (HZ, where Z is an anion) to form ammonium salts according to equation (17):

$$2NH_yX_{3-y} + 2HZ + 2(3-y)H_2O \rightarrow 2NH_4Z + 2(3-y)HOX \quad (17)$$

The chloramines, bromoamines and iodoamines are also susceptible to irreversible hydrolysis in strongly alkaline media to form dinitrogen.

The physicochemical properties of haloamines are determined by the H/X ratio and by the type of halogen within the structure. For example, the polarity of a haloamine increases in the order NCl$_3$<NHCl$_2$<NH$_2$Cl (<NH$_3$). The partitioning of these products between polar and nonpolar solvents follows the same trend. Haloamines are known to have antimicrobial action, as a result of their ability to release hypohalogenite ions (e.g. OCl$^-$) according to equations (14)-(16).

In some embodiments, the halogen is chlorine and the at least one haloamine compound comprises at least one selected from the group consisting of NCl$_3$, NHCl$_2$ and NH$_2$Cl. A mixture of haloamines may in practice be formed as primary reaction products, depending on the reaction conditions and any stoichiometric limitations on the reducible source of chlorine. Moreover, in acidic aqueous media the chloramines generally exist in equilibrium according to the following equations (18)-(20):

$$NCl_3 + H_2O \rightarrow NHCl_2 + HOCl \quad (18)$$

$$NHCl_2 + H_2O \rightarrow NH_2Cl + HOCl \quad (19)$$

$$NH_2Cl + H_2O \rightarrow NH_3 + HOCl \quad (20)$$

The equilibrium speciation of the chloramines is dependent on the pH, with lower pH values favouring the more halogenated forms (i.e. NHCl$_2$ and particularly NCl$_3$).

Cathode Comprising a Dinitrogen-Activating Electrocatalytic Composition

The methods of the invention require a cathode comprising a dinitrogen-activating electrocatalytic composition. In use, the cathode is contacted with an electrolyte in an electrochemical cell, and dinitrogen is reduced on the cathode in the presence of the reducible sources of halogen and hydrogen to form at least one haloamine compound.

The electrocatalytic composition may generally be any electrocatalyst capable of activating dinitrogen, including any of the metals or other materials that are recognised as being active in binding N$_2$. A wide range of transition metal electrocatalysts have been investigated for the NRR, including by Skulason et al, Physical Chemistry Chemical Physics 2012 14 1235, and it is considered that the metals disclosed therein for the NRR are also suitable for the eNFR described herein.

In some embodiments, the electrocatalytic composition comprises a metallic composition. As used herein, a metallic composition comprises metal atoms at least predominantly, and preferably substantially entirely, in the zero oxidation state, and includes both single element metals and metal alloys. The metallic composition may comprise at least one metal selected from the group consisting of ruthenium, iron, rhodium, iridium, molybdenum, chromium, tungsten, cobalt, bismuth and nickel. Previously reported theoretical calculations indicate that these metals intrinsically provide the most favourable interaction with dinitrogen and therefore offer the optimum conditions for reduction reactions of dinitrogen. The metallic composition may consist of one of these metals only, be an alloy of several of these metals or an alloy of one or more of these metals with other elements.

In some embodiments, the metallic composition comprises metallic ruthenium, rhodium or iridium, including stabilised alloys of these metals with other elements such as iron, cobalt, chromium, nickel, bismuth, tungsten, molybdenum, vanadium and rhenium. Ruthenium, rhodium or iridium advantageously have a high intrinsic activity for nitrogen reduction and are stable in acidic electrolytes at potentials that are close to or more positive than the Reversible Hydrogen Electrode (RHE) potential.

In some embodiments, the metallic composition is in the form of micro- and/or nanoparticles, i.e. have a particle size of less than 1 µm. Such small clusters may advantageously provide a high abundance of catalytic sites for nitrogen reduction to take place. As an example, the inventors have found in one experiment that closely packed ruthenium clusters with a diameter of about 1 µm or less, dispersed on carbon fibre paper, provide excellent performance in the eNFR.

In other embodiments, the electrocatalytic composition is a carbon material or a doped carbon material containing active sites that are capable of binding dinitrogen.

The electrocatalytic composition may be deposited on or attached to a conductive or semiconductive support material which forms at least part of the cathode. The support material provides a conductive pathway to allow a reductive electron flow from a power source through the cathode to the dispersed electrocatalytic composition. The support material may, for example, be carbon cloth, carbon fibre paper, carbon nanotubes, carbon particles, stainless steel mesh, titanium mesh or other materials that are stable in the electrolyte medium used. In some embodiments, the support material is a porous, high surface area material to allow increased loading of the electrocatalytic composition at the cathode-electrolyte interface. The support material may itself define the cathode structure. Alternatively, the support material and electrocatalytic composition may be applied to the surface of a conductive cathode substrate to provide a low resistance pathway to the external circuit. Suitable conductive substrates are known to those skilled in the art and include metallic substrates and carbon substrates such as glassy carbon.

A variety of methods for preparing supported electrocatalytic compositions have been reported. For example, a metal salt may be chemically or electrochemically reduced in the presence of a suitable support material, leading directly to supportation of a dispersed metallic composition on the support surface.

In some embodiments, the cathode is configured as a gas diffusion electrode. Such electrodes are designed to maximise the three phase interface between a flowing gas stream, the electrolyte and the catalyst/support/conductor of the cathode itself.

Electrolyte

In the methods of the invention, the cathode is contacted with an electrolyte. As will be appreciated, an electrolyte is required in an electrochemical cell to provide electrochemical communication, including the transfer of charged species, between the cathode and the anode. Moreover, one or more of the reactants may be provided for reaction at the cathode as a solution in the electrolyte and/or one or more reaction products may be present in solution in the electrolyte.

The electrolyte may generally be any suitable electrolyte for electrochemical reactions, including liquid and gel electrolytes. In some embodiments, the electrolyte is an aqueous electrolyte, for example having a pH in the range of 0 to 14. In some embodiments, the electrolyte is an acidic aqueous electrolyte, for example a solution of HCl. Acidic electrolytes provide an inherently high concentration of $H^+$ as the source of hydrogen for reaction at the cathode.

In some embodiments, the aqueous electrolyte comprises dissolved halide, for example a hydrogen halide such as HCl. The halide concentration may be at least 0.05 mol/litre, or at least 0.1 mol/litre, or at least 0.5 mol/litre, such as about 1 mol/litre. As disclosed herein, the use of an aqueous halide electrolyte solution provides the opportunity to generate at least a portion of the source of reducible halogen, e.g. HOCl, in situ at the anode of the electrochemical cell.

In other embodiments, the electrolyte comprises an aprotic liquid, such as an ionic liquid. Suitable ionic liquids and aprotic liquid electrolytes include those disclosed in the applicant's application PCT/AU2017/000036, which is hereby incorporated by reference. These disclosed aprotic liquid-based electrolytes were found to provide improvements in faradaic efficiency for the NRR, believed to be due to the high $N_2$ solubility and the reduced concentration of water in the electrolyte. The increased dinitrogen solubility provided by ionic liquid electrolytes may also be beneficial for the eNFR reaction disclosed herein. Moreover, the low volatility of such electrolytes may advantageously be exploited to separate the haloamine products from the electrolyte by gas-liquid partitioning, either within the electrochemical cell or by withdrawing electrolyte from the cell for external product separation.

Thus, in some embodiments, the electrolyte comprises an ionic liquid including:
  (i) a cation selected from the group consisting of $PR_{1-4}$ (phosphonium), $NR_{1-4}$ (tetra alkylammonium), $C_4H_8NR_2$ (pyrrolidinium), wherein each R group is independently linear, branched or cyclic and preferably comprises from 1 to 18 carbon atoms, optionally partially or completely halogenated, optionally including a heteroatom, optionally including a functional group preferably chosen from ethers, alcohols, carbonyls (acetates), thiols, sulphoxides, sulphonates, amines, azos or nitriles, and wherein two R groups may connect to form a monocyclic or heterocyclic ring; and
  (ii) an anion selected from the group consisting of $(R'O)_xPF_{6-x}$ (phosphate), $(R'O)_xBF_{4-x}$ (borate), $R'SO_2NSO_2R'$ (imide), $R'SO_2C(SO_2R')(SO_2R')$ (methide), $FSO_2NSO_2F$, $C_2O_4BF_2$, $C_2O_4PF_4$, $RC_2O_4BF_2$, $RC_2O_4PF_4$, $CF_3SO_3$ (triflate), $R'SO_3$ (sulphonate), $R'CO_2$, (carboxylate), $CF_3OOO$ (trifluoroacetate), $R'_xPF_{6-x}$ (FAP), $R'_xBF_{4-x}$ wherein each R' group is independently linear, branched or cyclic and preferably comprises from 1 to 18 carbon atoms, optionally partially or completely fluorinated and optionally including a functional group, preferably chosen from ethers, alcohols, carbonyls (acetates), thiols, sulphoxides, sulphonates, amines, azos or nitriles and wherein two R' groups may connect to form a monocyclic or heterocyclic ring.

In some embodiments the ionic liquid comprises a cation selected from the group consisting of $C_4$mpyr (butyl-methyl pyrrolidimium), $P_{6,6,6,14}$ (trihexyl tetradecyl phosphonium), $P(C_2R_f)_4$ (where $R_f$ is a perfluoroalkyl), and an anion selected from the group consisting of eFAP ($C_2F_5PF_3$), NfO (nonafluorobutane sulphonate), PFO (perfluorooctane sulphonate), FSI (bis(fluorosulphonyl)imide), $NTf_2$ (bis(trifluoromethylsulphonyl)imide), $B(otfe)_4$ (tetrakis(2,2,2-trifluoroethane)borate and $CF_3OOO$ (trifluoroacetate).

In some embodiments, the ionic liquid includes a cation selected from $PR_{1-4}$ (phosphonium) cations and an anion selected from $RSO_3$ (sulphonate; such perfluorobutanesulphonate, perfluoropropanesulphonate), or trifluorophosphates (such as eFAP; tris(perfluoroethyl)trifluorophosphate).

Figure 2:
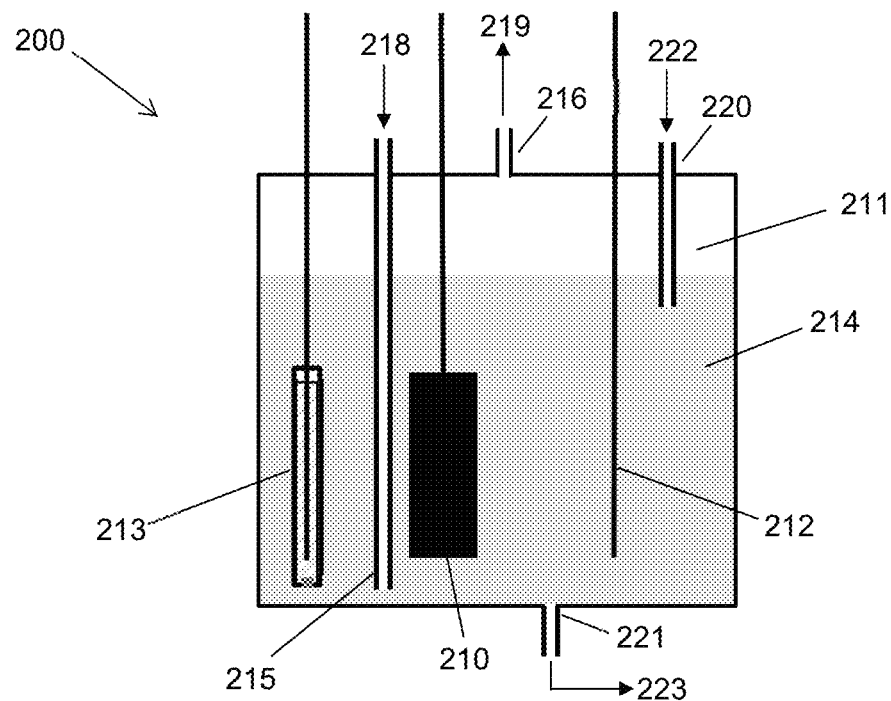
FIG. 2 schematically depicts a single-chamber electrochemical cell for reducing dinitrogen to form haloamines according to embodiments of the invention.

In some embodiments, for example as described herein with reference to FIG. 2, only one electrolyte is required in the electrochemical cell and the cathode and anode are both contacted with this electrolyte. In other embodiments, for example as described herein with reference to FIG. 3, the cathode and anode are contacted with different electrolytes, which must nevertheless be in electrochemical communication to allow transfer of charged species (e.g. $H^+$) during the reaction.

Reducible Source of Halogen

The methods of the invention require a reducible source of halogen to be provided for reaction at the cathode. Reduced nitrogen species produced via an electrocatalysed reaction at the cathode can thus react with the reducible source of halogen, thereby providing the halogen component of the haloamine product.

The reducible source of halogen may in general be any reducible species capable of transferring halogen to reduced dinitrogen in a reaction at the cathode. It will be appreciated that suitable reducible sources of halogen are distinguished from halide anions, which are already fully reduced and thus unable to participate in reactions at the cathode.

The reducible source of halogen may be selected from $OX^-$, $HOX$ and $X_2$, where X is a halogen which may be selected from chlorine, bromine and iodine. In some embodiments, the source of reducible halogen comprises at least one selected from the group consisting of hypochlorite anion ($OCl^-$), hypochlorous acid ($HOCl$) and dichlorine ($Cl_2$). It will be appreciated that the source of reducible chloride actually reacting at the cathode may dependent on the choice of electrolyte and the reaction conditions.

For example, dissolved HOCl is the predominant HOCl/$OCl^-$ species in equilibrium with $Cl_2$ present in acidic aqueous electrolytes and it is expected that this is the relevant chlorine source available for reaction. However, in neutral or alkaline aqueous electrolytes, the reacting source of reducible chlorine may instead be $OCl^-$. In non-aqueous electrolytes, such as ionic liquids, the source of reducible chlorine which reacts may be $Cl_2$, for example added as a gas together with the $N_2$ reactant.

In other embodiments, the reducible source of halogen comprises at least a portion of halogen species in higher oxidation states, for example chlorite ($ClO_2$), chlorate ($ClO_3^-$) and perchlorate ($ClO_4^-$).

In some embodiments, the reducible source of halogen is provided for reaction in solution in the electrolyte at a concentration of at least $1\times10^{-5}$ mol/litre, such as a concentration of at least $1\times10^{-4}$ mol/litre. Higher concentrations are expected to lead to higher reaction rates.

As described herein, at least a portion of the reducible source of halogen may be provided internally in the electrochemical cell by oxidation of halide anions at the anode. For example, in HCl aqueous electrolytes, HOCl is provided at the anode according to equation (10). In another example, the chloride may be at least partially oxidised to chlorate at the anode, with the chlorate thus forming part of the reducible source of halogen available for reduction at the cathode. An additional portion, or indeed the entire complement of the reducible source of halogen may be provided via an external stream fed to the electrochemical cell for reaction at the cathode. As described herein, this material may optionally be provided by recycling the halogenated by-product from subsequent hydrolytic conversion of the haloamine product to ammonium salts.

Source of Hydrogen

The methods of the invention also require that a source of hydrogen is provided for reaction at the cathode. The source of hydrogen may react with reduced nitrogen species at the cathode and/or reacts in the electrolyte with by-products resulting from consumption of the source of reducible halogen (e.g. with $OH^-$ according to equation 5). In the most general form of the invention, any chemical species capable of providing hydrogen atoms to the reduced products of electrochemical reduction processes may be used.

In some embodiments, the source of hydrogen comprises $H^+$ or $H_2O$. In acidic aqueous electrolytes, the reacting source of hydrogen is expected to be $H^+$ (alternatively expressed as $H_3O^+$). However, in neutral or alkaline aqueous electrolytes, the reacting source of hydrogen may instead be $H_2O$. In non-aqueous electrolytes, such as ionic liquids, it may be necessary to ensure that a sufficient concentration of water or other hydrogen source is provided for reaction at the cathode. For example, a small amount of water may be added to either the electrolyte or the $N_2$ feed.

Reduction Conditions

In the methods of the invention, a potential (i.e. a voltage) is applied at the cathode which is sufficient to reduce dinitrogen on the dinitrogen-activating electrocatalytic composition in the presence of the reducible source of halogen and the source of hydrogen. At least one haloamine compound is thus produced. It will be appreciated that, to achieve significant yield of haloamine, a reductive current must flow through the cathode during the reaction. The potential at the cathode may be controlled to be constant or may be varying in time either to reflect intermittency in the power supply or to achieve a refresh action on the cathode and/or anode.

Given the inherent rate advantage of the two-electron HER, i.e. according to equation (2), compared to the six-electron eNFR, e.g. according to equation (4), the inventors consider it preferable that the reaction is generally carried out at potentials close to or more positive than the Reversible Hydrogen Electrode (RHE) potential. This has the effect of limiting the rate of the competing HER reaction rate and therefore allowing the selectivity (also known as the Faradaic Efficiency) of the eNFR process to be high.

In some embodiments, the potential is thus in the range of +250 mV to −500 mV relative to the reversible hydrogen electrode (RHE), or in the range of +150 to −300 mV relative to the to the RHE, such as in the range of +100 to −200 mV relative to the RHE. The inventors have demonstrated the reduction of $N_2$ to chloramines at a rate of 5.0 E-08 mol cm$^{-2}$ s$^{-1}$ and faradaic efficiency of about 88% at a reduction potential of −60 mV vs RHE.

The dinitrogen may be provided for reaction at the cathode at a partial pressure of between 0.7 bar and 100 bar, preferably between 1 bar and 30 bar, most preferably between 1 bar and 12 bar. Elevated partial pressures of $N_2$ may improve the faradaic efficiency of the eNFR by increasing the concentration of $N_2$ dissolved in the electrolyte, thereby favouring binding and subsequent reduction of $N_2$ at catalytic sites on the electrocatalytic composition.

The reduction may be carried out at low oxygen ($O_2$) conditions, and in particular the $N_2$ provided for reaction at the cathode may be substantially free of oxygen, such as containing less than 1 wt % $O_2$, or less than 0.1 wt % $O_2$. Low oxygen conditions minimises parasitic reduction of $O_2$ at the cathode which reduces faradaic efficiency.

The reaction temperature may be maintained in the range of −35° C. to 200° C., or 0° C. to 150° C., such as 15° C. to 100° C. during the reduction.

Anode and Anodic Reactions

The methods of the invention involve an electrochemical reduction of nitrogen to produce haloamine at a cathode, and it will be appreciated that a corresponding oxidation reaction must therefore take place at an anode to maintain charge neutrality in the electrochemical cell and provide or replenish the source of hydrogen consumed at the cathode.

In the most general form of the invention, the anodic oxidation reaction is not considered to be particularly limited. For example, suitable anode reactions may include hydrogen oxidation, water oxidation, hydroxide oxidation or halide ion oxidation. Suitable anodes for these anodic reactions are known to those skilled in the art.

In some embodiments, the anode reaction is required to produce a reducible source of halogen for consumption at the cathode by oxidising a halide anion dissolved in the electrolyte. To minimise stoichiometric limitations on the halogen source available for reaction at the cathode, it may thus be preferred to maximise the faradaic efficiency of halide oxidation at the anode. Suitable anodes for halide oxidation with high faradaic efficiencies include electrocatalysts comprising at least one selected from the group consisting of platinum, platinum-iridium alloys, platinized titanium, mixed metal oxide clad titanium anodes, manganese dioxide, ferrosilicon and graphite.

Electrochemical Cell

An electrochemical cell suitable for performing the electrochemical reduction of dinitrogen to produce haloamine generally includes a cathode comprising an electrocatalytic composition as disclosed herein, an anode as disclosed herein and a power supply connected to the cathode and the anode. The power supply is capable of providing a potential at the cathode sufficient to reduce dinitrogen on the electrocatalytic composition at a current flow suitable to produce a desired yield of dinitrogen reduction products.

The cell may be configured such that the cathode and anode are in contact with the same electrolyte, and means for mixing the electrolyte may be provided to ensure good mass transfer in the cell chamber. Such a configuration may be preferred in embodiments wherein the anode provides the reducible source of halogen in the electrolyte for immediate reaction at the cathode. Alternatively, the cell may comprise separate cathodic and anodic chambers, capable of containing different electrolytes but connected by a separator to allow ionic transfer and thus the maintenance of charge neutrality.

Depending on the target mode of operation, the electrochemical cell may include at least one gas inlet to convey dinitrogen for reduction at the cathode, at least one gas outlet to remove reduction product gases from the cell, at least one electrolyte inlet for introducing fresh electrolyte and at least one electrolyte outlet for withdrawing liquids including the electrolyte and dissolved haloamine products.

In some embodiments, the cell is configured to recirculate the residual $N_2$ from the exiting product gas stream, after removal of other components such as haloamine products, to the gas inlet together with an amount of make-up $N_2$. In some embodiments, the cell is configured to separate $H_2$ from the exiting product gas stream and recirculate it for oxidation (to $H^+$) at the anode. In this manner, $H_2$ co-produced with the haloamine product is recycled back into the process. This may result in reduced energy consumption per unit of haloamine produced as there is no other energy containing by-product.

The electrochemical cell generally comprises a body configured to retain the electrolyte(s). In some embodiments, the body is pressure resistant, such that an elevated partial pressure of $N_2$ gas may be accommodated. Pressures up to 100 bar are envisaged. The cell may also be provided with other conventional equipment, such as heaters for maintaining a desired reaction temperature.

The power supply may be any conventional power supply for electrolysis systems, such as a direct current power source. Optionally, the power supply may include a photovoltaic solar cell. It is considered a particular advantage of the present invention that haloamines may be produced from electrical power, and particularly renewable power.

Recovery and Conversion of Haloamines

The method of the invention may include a step of recovering a product composition comprising the at least one haloamine compound from the reaction zone of the electrochemical cell in which it was produced. For example, in system 200 depicted in FIG. 2, liquid product stream 223 and/or gas product stream 219 comprising chloramine products is recovered from cell chamber 211. In system 300 depicted in FIG. 3, liquid product stream 323 and/or gas product stream 319 comprising chloramine products is recovered from cathodic chamber 311.

The product composition may be processed in a variety of ways depending on the intended use of the haloamines. Such uses may include, without limitation: (1) in the case of chloramine products, direct use of the aqueous chloramine solution in water disinfection or fertilizer applications, optionally after dilution or pH adjustment to control the chloramine speciation, (2) concentration of the product composition to form a more concentrated solution of haloamine, (3) separation of the haloamine from the product composition by liquid-liquid extraction, (4) separation of the haloamine from the product composition by gas-liquid partitioning/extraction, (5) conversion of the haloamine to ammonium salts, optionally with recovery of the ammonium salts in solid form, e.g. for fertilizer applications, and (6) production of ammonia ($NH_3$).

For use (1), applicable when the eNFR produces an acidic aqueous product composition comprising chloramine, the solution may be rendered suitable for use as a water disinfection agent or fertilizer by adjusting the pH of the solution to a more neutral pH, such as from 5 to 9. This may be done simply by dilution with water or by neutralising the solution with a base such as KOH. The change of proton activity causes an increase in the $NH_2Cl$ concentration according to equations (18)-(19), $NH_2Cl$ being the most desired chloramine component.

For use (2), a more concentrated haloamine product may be obtained by distilling or evaporating the product composition to remove a portion of the volatiles such as water. This may advantageously improve the transportability of the haloamine product.

For use (3), which applies when the product composition is aqueous, the haloamine product may be extracted from the aqueous composition into a non-aqueous solvent using conventional liquid-liquid extraction techniques. Suitable non-aqueous solvents may be readily determined without difficulty, and may include polar but water-immiscible organic solvents such as chlorinated solvents (including di- or trichloromethane) and acetonitrile.

For use (4), the haloamine compound may be separated from the liquid product composition by partitioning it into a gas phase. For example, the use of ionic liquid electrolytes may allow ready gas-liquid separation of haloamine products from the involatile electrolyte, either within the cell or by withdrawing electrolyte from the cell for external product separation.

Uses (5) and (6) involve the conversion of the haloamine product(s) into non-haloamine ultimate products, in particular ammonium salts or ammonia. This conversion is reported to proceed via an acid hydrolysis reaction, as shown in representative equation (21) for chloramines specifically:

$$2NH_yCl_{3-y} + 2HZ + 2(3-y)H_2O \rightarrow 2NH_4Z + 2(3-y)HOCl \qquad (21)$$

(where Z is an anion)

It is evident from equation 21 that the conversion of haloamines to ammonium compounds can be driven in the forward direction by use of high acid (HZ) concentration and by removal of the HOCl product. Both of these conditions may be promoted by stripping off volatiles, including water, from the product composition, for example under vacuum or with gas stripping.

The conversion of the intermediate haloamine compounds into ammonium salts and/or ammonia typically takes place by non-electrochemical reactions and in a separate process step from the electrochemical synthesis of the haloamine compounds, either in a different reaction vessel or in a sequential step after production of the haloamines.

In use (5), the product composition containing acid (HZ) is subjected to vacuum or gas stripping conditions sufficient to transform the haloamines into ammonium salts. The volatiles may be removed entirely to recover the ammonium salt product as a solid. In embodiments where the electrolyte is an aqueous HCl solution, ammonium chloride ($NH_4Cl$) will be formed as the ammonium product salt without the need for extraneous HZ addition. However, in some embodiments, sulfuric acid (or other source of sulphate) or phosphoric acid (or other source of phosphate) is added to the product composition prior to or during the stripping so that ammonium sulphate or ammonium dihydrogen phosphate salts are formed. These salts may be the preferred ammonium salt products if the intended use is in fertilizer applications.

In use (6), the haloamine product is converted to ammonia ($NH_3$). This may be done by first transforming the haloamine to intermediate ammonium salt products, for example as described for use (5). The conversion of the ammonium salt to ammonia may then be achieved by conventional means, typically including thermally decomposing the ammonium salt by heating and/or reducing the pressure, or by reaction with a strong base such as NaOH.

When haloamine products are converted to ammonium salts, a halogen-containing by-product is produced, for example HOCl according to equation (21). This by-product may be recovered and recycled to the electrochemical cell for use at the cathode as at least part of the reducible source of halogen. The source of halogen may thus be reused in a closed loop in the process. Alternatively, the HOCl may be photolytically decomposed back to chloride via equation (22):

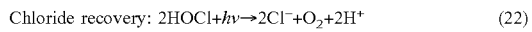

Chloride recovery: $2HOCl + h\nu \rightarrow 2Cl^- + O_2 + 2H^+$ (22)

Method of Producing Ammonia or an Ammonium Salt from Dinitrogen

The present invention also relates to a method of producing ammonia or an ammonium salt from dinitrogen. The method comprises contacting a cathode comprising a dinitrogen-activating electrocatalytic composition with an electrolyte, and providing dinitrogen ($N_2$), a reducible source of halogen and a source of hydrogen for reaction at the cathode. A potential is then applied at the cathode which is sufficient to reduce the dinitrogen on the dinitrogen-activating electrocatalytic composition in the presence of the reducible source of halogen and the source of hydrogen, thereby producing at least one haloamine compound. The at least one haloamine compound is then converted to ammonia or an ammonium salt in a second step.

The production of haloamine compounds by electrocatalytic reduction of dinitrogen has already been described herein. For the case where HOCl is the reducible source of halogen, the overall cell reaction is described by equation (11).

The conversion of haloamine compounds to ammonium salts by hydrolysis is previously reported and has also been described herein. For example, the hydrolysis of $NCl_3$ by the acid HZ (where Z is an anion) is shown in equation (21). This transformation is driven in the forward direction at high HZ concentrations and by the removal of HOCl under vacuum or by gas stripping. The anion (Z) may be selected to provide favourable properties in the ammonium salt, for example for use as a fertilizer. The overall reaction for the production of ammonium salts from $N_2$, derived from the combination of equation (11) where y=0 and equation (21), is shown in equation (22):

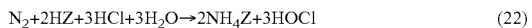

$N_2 + 2HZ + 3HCl + 3H_2O \rightarrow 2NH_4Z + 3HOCl$ (22)

The haloamine compounds may also be converted to ammonia, for example via an ammonium salt intermediate which is produced as described herein. The ammonium salt intermediate may be converted to ammonia by conventional means, for example by thermal decomposition or by reaction with a strong base such as NaOH.

The method of producing ammonia or ammonium salts according to the invention may be preferred compared to direct dinitrogen reduction, despite the two-step route, because of the higher reaction rates and faradaic efficiencies obtainable in the eNFR compared to the NRR.

Figure 4:
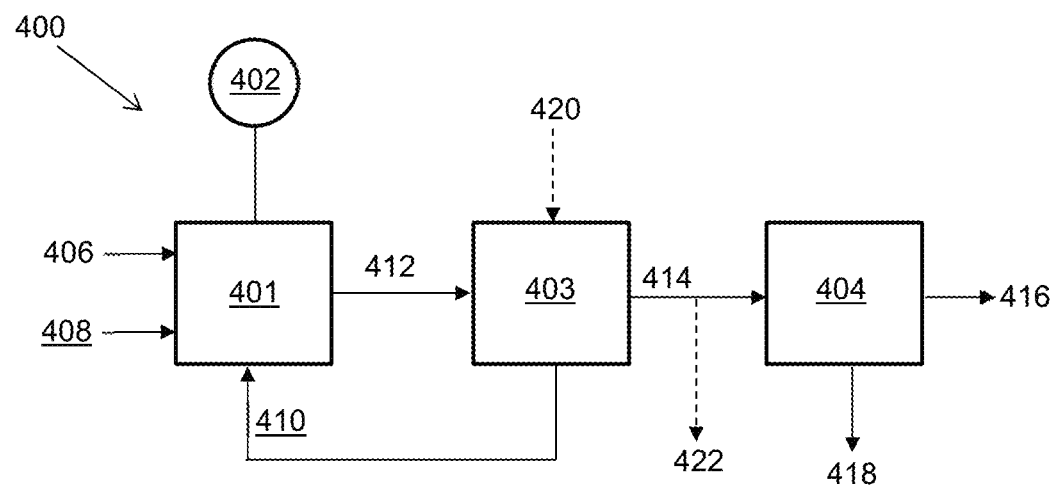
FIG. 4 is a block flow diagram of a process for the production of ammonia and/or ammonium salts from dinitrogen according to embodiments of the invention.

An embodiment of the invention will be described with reference to FIG. 4, which depicts a block flow diagram of process 400 for the production of ammonia and/or ammonium salts from dinitrogen. Process 400 includes 3 process units, including electrochemical cell 401 with power supply 402, hydrolyser 403 and ammonia producer 404. Electrochemical cell 401 may optionally be configured as cell 200 or cell 300, described herein with reference to FIGS. 2 and 3 respectively.

In use, dinitrogen 406, aqueous HCl solution 408 and HOCl-containing stream 410 are fed to electrochemical cell 401, where they react as described herein, according to equation (11), to form chloramine product(s). Aqueous product stream 412 comprising the chloramine product is withdrawn from cell 401 and sent to hydrolyser 403.

In hydrolyser 403, the chloramine products are hydrolysed to form ammonium salts, for example according to equation (21). Hydrolysis is promoted by removal of the volatiles including water and the HOCl by-product, which is recycled to electrochemical cell in stream 410. Unless a different anion source is added to the hydrolyser, solid ammonium product salt 414 comprises ammonium chloride.

The ammonium chloride product may then be sent to ammonia producer 404, where it is thermally decomposed to form ammonia ($NH_3$) as ultimate product 416 of process 400. The HCl by-product 418 may optionally be recycled into aqueous HCl solution 408 for re-use in the electrochemical cell.

Alternatively, acid 420 selected from sulfuric and phosphoric acid is added in hydrolyser 403 such that solid ammonium product salt 414 comprises ammonium sulphate or ammonium dihydrogen phosphate. This material may then be recovered as ultimate product 422 of process 400 and used in fertilizer applications.

EXAMPLES

The present invention is described with reference to the following examples. It is to be understood that the examples are illustrative of and not limiting to the invention described herein.

Materials

All chemical precursors were obtained from commercial suppliers of laboratory grade reagents, including Sigma Aldrich.

XRD measurements were performed using a Bruker D8 Advance diffractometer instrument equipped with standard Cu anode, K-α wavelength=1.54 nm. The typical scan range was 10° to 80°, collected with step size of 0.039° $s^{-1}$.

Specimens for electron microscopy were prepared by deposition of Ru-CFP and/or Pb—Ru-CFP on a SEM holder.

The specimens were stored in glass desiccator to avoid contamination. Scanning transmission electron microscopy (SEM) examination was carried out using an aberration-corrected JEOL ARM200F microscope operating at 15 kV to minimize radiation damage to the specimens. The instrument was fitted with a cold field emission electron source and a JEOL large area ($1^{st}$) energy dispersive X-ray spectrometer (EDS). This was coupled to a Noran System Seven analytical system. All imaging and analysis was carried in scanning transmission mode (SEM) using a high resolution-imaging probe of approximately 30 pA current and 0.1 nm diameter with a convergence semi-angle of 24.9 mrad. Imaging was carried out in high angle annular dark field (HAADF) and bright field (BF) modes, yielding mass-thickness and diffraction contrast information respectively. The inner and outer acceptance angles for HAADF imaging were 68 and 280 mrad, respectively, and for BF imaging the acceptance semi-angle was 17 mrad. Scanning images were captured using Gatan's DigiScan hardware and Digital Micrograph software.

X-ray photoelectron spectroscopy measurements were performed with Thermo ESCALAB250i X-ray photoelectron spectrometer. For spectra calibration, the C1s were aligned to 284.80 eV.

Electrochemical evaluations were conducted in a single compartment cell, i.e. without separation between anode and cathode. An inlet pipe was provided to bubble a gas ($N_2$ or Ar) into the electrolyte near the cathode and an outlet gas port was provided to remove gas from the headspace of the system. A three electrode set-up with a VMP2-Biologic potentiostat was used in all measurements. The working cathode, reference electrodes (saturated Ag/AgCl) and the anode (Pt wire) were inserted in the cell. Typically, the electrolyte was de-gassed through a vacuum line (connected to the outlet cell port) and filled with $N_2$ (high-purity $N_2$ or Ar, Alphagaz-grade; purity 99.9999%) through the inlet port before commencement of reduction. The vessel was stirred with a magnetic stirrer (1400 RPM). Electrodes were subjected to one chronoamperometric and/or cyclovoltammetric scan prior to quantification of products.

The nitrogen fixation products were determined qualitatively by the well-known DPD (N,N-diethyl-p-phenylenediamine, ISO 7393-2:2017) method using an analysis kit supplied by Merck. In this method, quantification of nitrogen fixation products was achieved by dilution in ethanoate buffer mixture at pH 5 (0.5 M) followed by reduction with potassium iodide producing ammonia according to $$NHCl_2 + 6I^- + H_2O + 2H^+ \rightarrow NH_4OH + 2Cl^- + 2I_3^-$$

The ammonia produced was quantified by either $^1$H NMR or the indophenol method. In the indophenol method, electrolyte (0.5 mL) was taken from the cell electrolyte solution and transferred into a 1 mL sample tube. Into the tube was then added 0.5 M $NaClO_4$ (0.4 mL), 1 M NaOH with 5 wt. % salicylic acid and 5 wt. % sodium citrate solution (100 μL) and 0.5 wt. % $C_5FeN_6Na_2O$ (sodium nitroferricyanide) in water (30 μL). The mixture was then incubated in the dark at room temperature for 3 hours before the UV-Vis test. The concentration of ammonia was then determined by measuring the indophenol blue absorbance at 660 nm and correlating the absorbance with ammonia concentration using a calibration plot. To generate the calibration plot, a series of standard solutions with known amount of $NH_4Cl$ in 10 mM HCl were prepared, and the above-mentioned indophenol blue reagents were added. The indophenol blue absorbance at 660 nm was then determined after 3 hours. The limit of detection (LOD) in this study refers to the absorbance at 660 nm obtained from blank ($H_2O$).

The product yield was also determined by $^1$H NMR spectroscopy. From the cell electrolyte solution, electrolyte (125 E-06 L) was taken and transferred into a 1 E-03 L sample tube. Into the tube was then added 50 E-06 M cis-butenedioic acid (125 E-06 L), 0.5 M $H_2SO_4$ (50 E-06 L) in water (0.75 E-03 L). The mixture was then shaken and introduced into the NMR tube for the analysis. The triplet at 7 ppm was integrated against the cis-butenedioic acid singlet peak cantered at 6.25 ppm. Given the integral of the triplet assigned to the $NH_4^+$ coupling and the concentration of the internal standard added, the $n_{NH4+}$ was then calculated.

Faradaic efficiency (FE) was then back-calculated from the amount of ammonia detected by the UV-Vis measurement ($n_{UV-Vis}$). The efficiency was determined by calculating the theoretical amount of produced $NH_3$ based on the six-electron transfer process of dinitrogen reduction to ammonia using $H_2O$ as proton source ($N_2 + 6H_2O + 6e^- \leftrightarrows 2NH_3 + 6OH^-$), using Faraday's law:

$$n_t = q/Fz$$

where:
$n_t$ is the theoretical moles amount of produced ammonia.
q is the total electric charge passed for the duration of electrolysis (C).
F is the Faraday's constant (96485.3 C mol$^{-1}$).
z is the number of electron transfer involved in reduction of N atom (3 e$^-$ per mole of $NH_3$).

Thus, FE (%) is determined as follows:

$$FE\ (\%) = n_{UV-vis}/n_t \times 100\%$$

The ammonium yield rate (in mol·cm$^{-2}$·s$^{-1}$) is determined as the average rate of formation of the measured ammonia product ($n_{UV-Vis}$) and/or ($n^1_{HNMR}$) during the experiment, normalised to the electrode surface area.

Example 1. Preparation of Carbon-Supported Ruthenium Metal Cathodes

1a) Ru-CFP

A carbon supported ruthenium material (Ru-CFP) was obtained by the electrochemical deposition of ruthenium chloride salt (2 gL$^{-1}$ mixture of $RuCl_3$ in HCl 1 M) on a carbon fibre paper (CFP) support (1 cm$^2$). The materials were synthesised by alternating cyclovoltammetric and chronoamperometric deposition. The cyclovoltammetric deposition consisted of 20 scans between 0 and −0.45 V vs SCE at 5 E-03 Vs$^{-1}$. This was followed by the chronoamperometric deposition at −0.45 V vs SCE for 5400 s at per side of the material.

Figure 5:
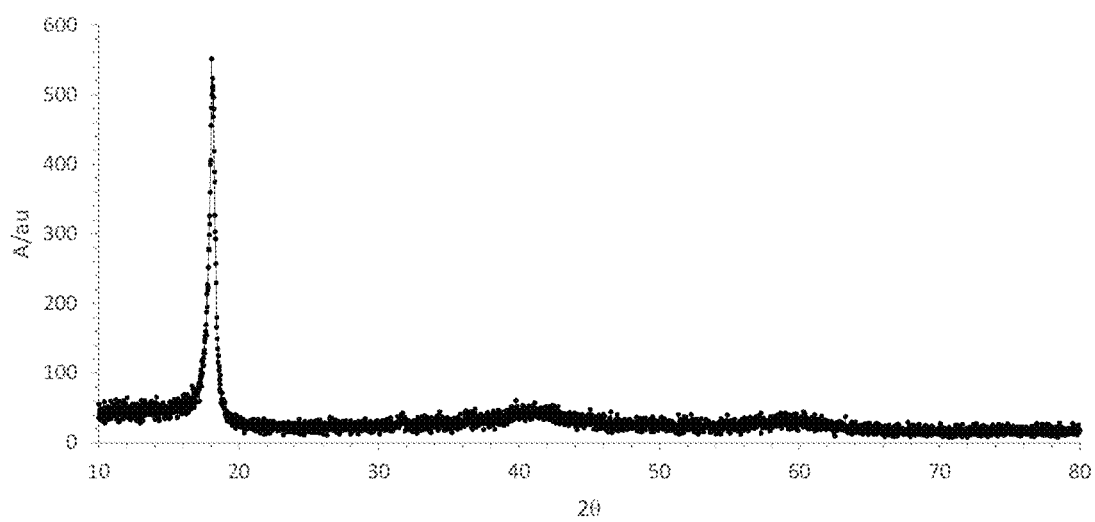
FIG. 5 is an X-ray diffraction spectrum (XRD) of metallic Ru clusters deposited on a carbon fibre paper substrate, as prepared in in Example 1.

The Ru-CFP samples were characterised by a number of techniques. FIG. 5 shows X-ray diffraction spectra (XRD) of the Ru-deposits on the carbon fibre. The spectra analysis revealed the absence of a crystalline phase of ruthenium. The remaining peaks were assigned to the carbon base substrate.

The morphology and composition of Ru deposited on CFP was further analysed with scanning electron microscopy (SEM). The SEM images confirmed that the Ru was present as coating on some areas of the carbon support, with a layer thickness of about 1 μm. The layer was made up of primary particles of diameter 1 μm or less. Other areas of the CFP were coated with individual particles.

The presence of Ru clusters over the surface of the CFP support was also confirmed with energy dispersive X-ray (EDS) characterization. The peak at 2.56 keV in the acquired EDS spectrum were assigned to Ru, in regions where Ru clusters were present. Survey EDS images demonstrated the uniform distribution of Ru atomic clusters dispersed across the stacked carbon fibres.

The phases of the Ru-CFP samples were further characterized by X-ray photoelectron spectroscopy (XPS). The Ru 3p spectra indicated that the Ru material in the analysed samples was a mixture of $Ru^0$ and $Ru^{4+}$ oxidation states. The latter is likely formed due to the surface oxidation of the Ru material upon exposure to air during sample preparation.

1b) Ru—Pb-CFP

A second carbon supported ruthenium material was obtained using the 1a) procedure described above, except that the cyclovoltammetric deposition was alternated (two times) with a cyclovoltammetric deposition (from 0 to −1.7 V vs SCE, 5 mV s-1, 1 cycle) of Pb from a 2 $gL^{-1}$ mixture of $PbCl_2$ in HCl 1 M.

The electrode was characterised using SEM and EDS analysis. The results indicated that the electrode contains both ruthenium and lead in a reduced oxidation state.

Example 2. Reduction of $N_2$ to Chloramine on the Carbon-Supported Ruthenium Metal Electrode by Cyclic Voltammetry The single compartment electrochemical cell was charged with aqueous HCl electrolyte (1M, 0.3 litres) at room temperature (i.e. about 25° C.) and atmospheric pressure (i.e. about 101325 Pa). The carbon-supported ruthenium metal cathode prepared in Example 1 b (Ru—Pb-CFP), the Ag/AgCl SCE reference electrode and the platinum (Pt) wire anode were immersed in the electrolyte. The cell vas evacuated (10000 Pa) and back filled with dinitrogen gas at atmospheric pressure. A cyclic voltametric scan was conducted between 0 and −1.7 V vs Ag/AgCl with a scan rate of 5 E-03 V $s^{-1}$.

Figure 6:
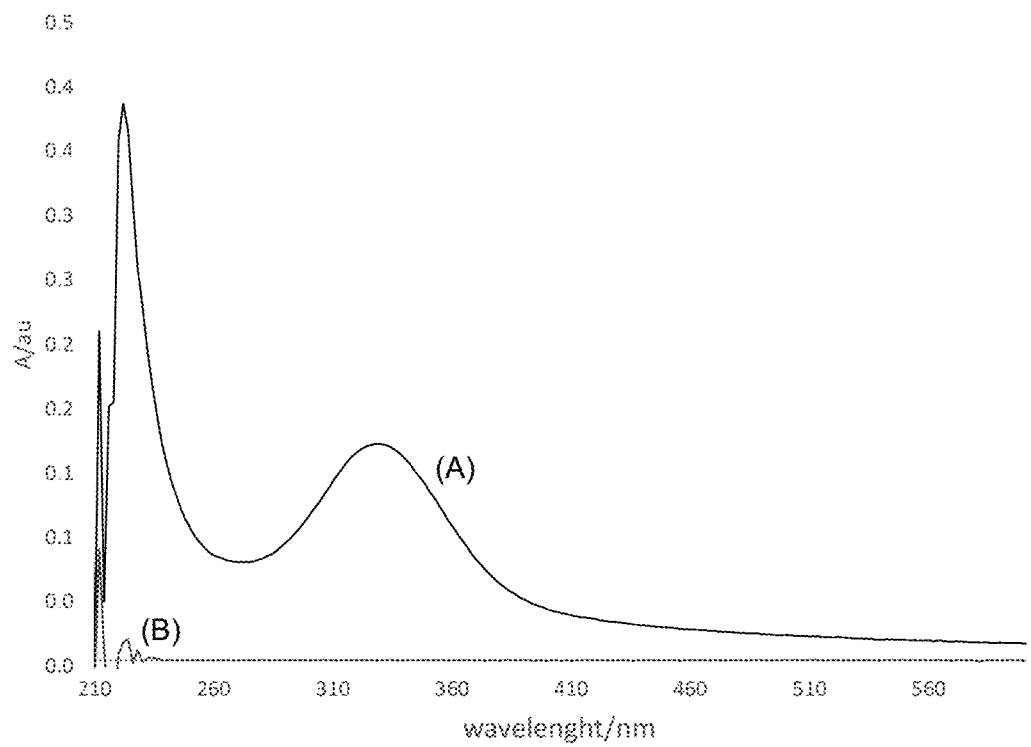
FIG. 6 is a UV-vis spectrum of the dichloromethane extracted phase of electrolyte (A) after the electrochemical reductive process in Example 2, with comparison against neat dichloromethane solvent (B).
Figure 7:
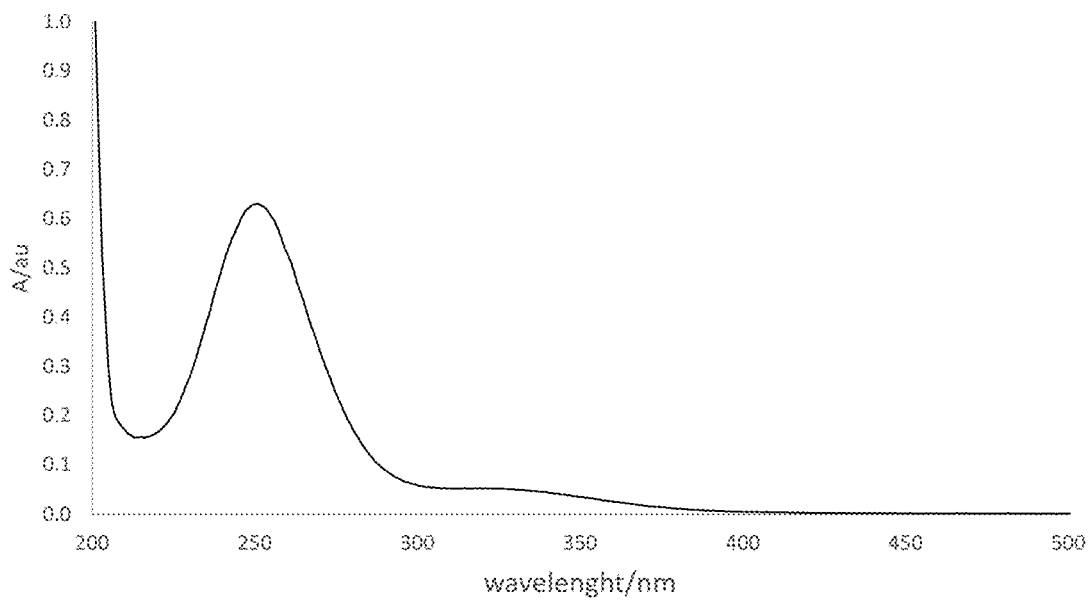
FIG. 7 is a UV-vis spectrum of the acetonitrile diluted phase of the electrolyte after the electrochemical reductive process in Example 2.

After the reaction, small samples of the electrolyte were recovered and extracted with organic solvents (3 ml electrolyte extracted with 1 ml of solvent). Extractions were done using chloroform and dichloromethane in this way, and another sample was diluted with acetonitrile. The organic solvent phase was separated and analysed with UV-vis spectroscopy (using a quartz cuvette, path length 10 E-03 m). The spectra for the dichloromethane extract and acetonitrile diluted sample are shown in FIGS. 6 and 7 respectively. The spectra exhibit characteristic peaks between 220 and 350 nm attributed to chloramines as reported by Zhang et al *Water Research* 68, 2015, 804-811.

Without wising to be bound by any theory, it is believed that the formation of chloramine in the electrolyte proceeded according to the following reactions:

(anode half-reaction)

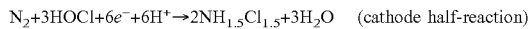
(cathode half-reaction)

Example 3. Conversion of Chloramine to Ammonium Salts

Figure 8:
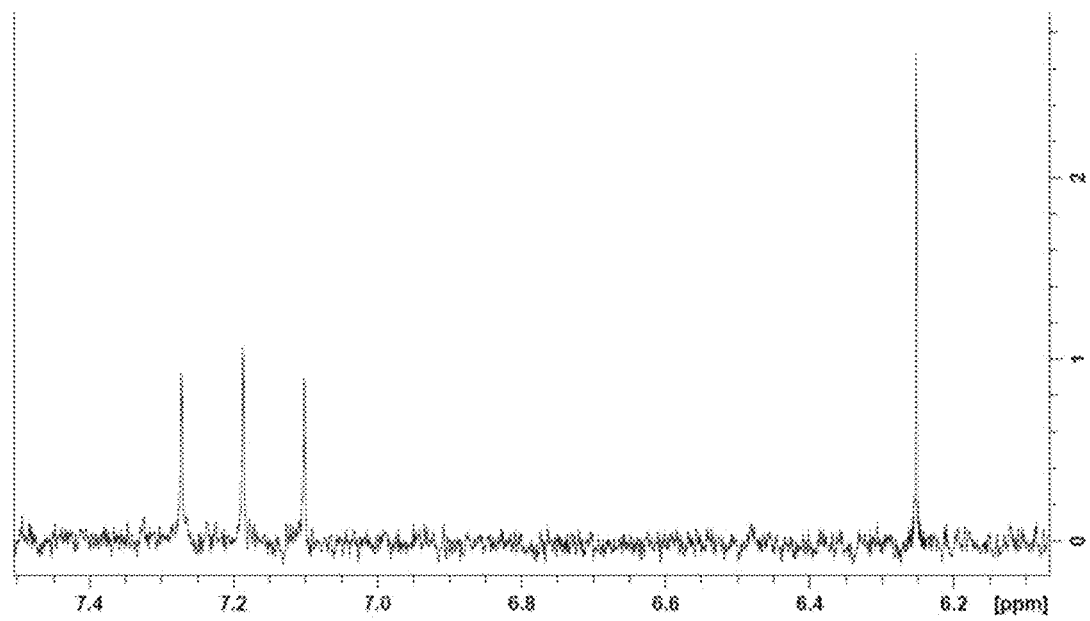
FIG. 8 shows the $^1$H NMR spectrum of the dry extract recovered when removing the volatiles from the electrolyte after the electrochemical reductive process in Example 2.

The remaining electrolyte after the experiment of Example 2 was removed from the cell and evacuated under a mild vacuum (about 10000 Pa) at 50° C. A dry solid was recovered after removing the volatiles. The dry solid was analysed by $^1H$ NMR spectroscopy and characterised as containing ammonium salt (ammonium chloride) via the characteristic N—H coupling peaks, as seen in FIG. 8. The amount of ammonium salt formed was quantified using maleic acid as an internal standard. The corresponding reaction yield rate for formation of chloramine in Example 2 (normalised to the electrocatalytic surface area of the cathode) was calculated to be 1.5 E-08 mol $cm^{-2}$ $s^{-1}$ from the NMR results.

The ammonium quantification was also performed by the indophenol blue method on several aliquots of the dry solid sample. The reaction yield rate was found to be 1.4 E-08 mol $cm^{-2}$ $s^{-1}$ by this method, which is in good agreement with the $^1H$ NMR data.

It is believed that the ammonium chloride was formed by hydrochloric acid hydrolysis of the chloramine primary products during the evacuation, as described by D. L. Chapman, L. Vodden, *J. Chem. Soc.*, Transactions. 1909, 95:138. The $Cl_2$/HOCl by-product was removed during the evacuation, leaving the ammonium salt product according to the equation:

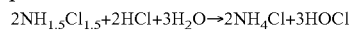

Figure 9:
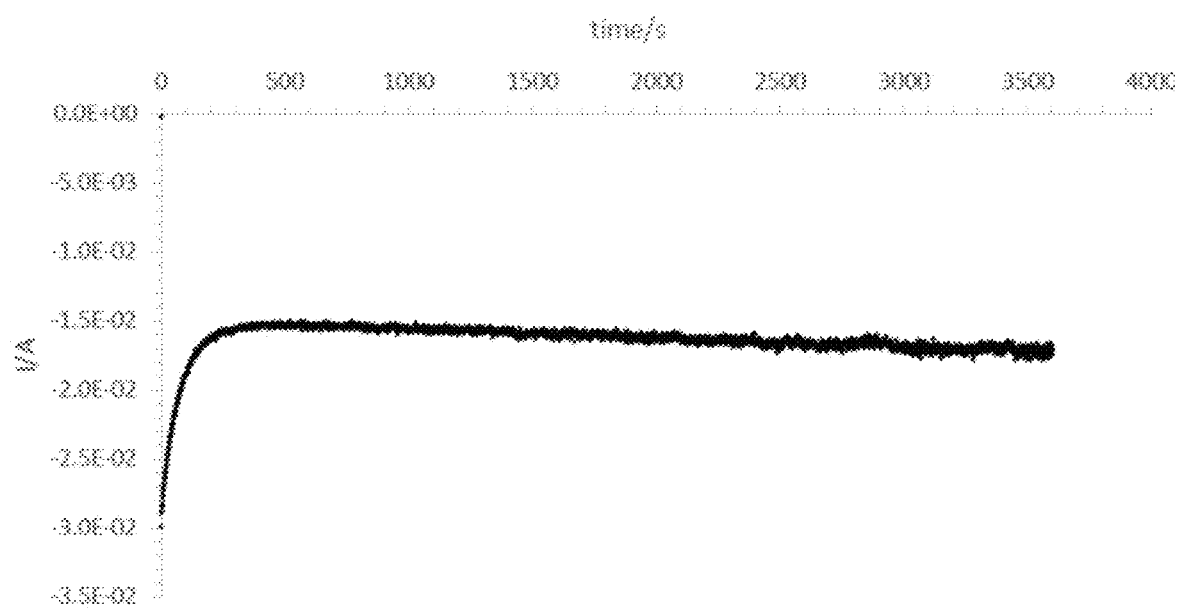
FIG. 9 shows the chronoamperometric profile when reducing dinitrogen to chloramines at constant potential in Example 4.

Example 4. Reduction of $N_2$ to Chloramine on the Carbon-Supported Ruthenium Metal Electrode by Chronoamperometry An electrochemical cell was set up and filled with $N_2$ as described in Example 2, except that the cathode was as prepared in Example 1a (i.e. Ru-CFP). An electrochemical reaction was immediately conducted for 3600 s using a chronoamperometry method at constant potential of −0.26 V vs Ag/AgCl (0.06 V vs RHE). The resulting chronoamperometric profile is shown in FIG. 9. Formation of chloramine product was again confirmed by solvent extraction and UV-vis analysis, as described in Example 2.

The chloramine yield was analysed by potassium iodide oxidation followed by detection of ammonium by $^1H$ NMR using maleic acid as an internal standard. The reaction yield rate for formation of chloramine (normalised to the electrocatalytic surface area of the cathode) was thus calculated to be 5.0 E-08 mol $cm^{-2}$ $s^{-1}$. The total charge passed during the experiment was 59 C. Thus, the faradic efficiency for chloramine production in this process was calculated to be 88% (the error in this method of analysis is estimated to be ±10%).

Example 5. Dilution of Chloramine Product Solution to Neutral pH

A solution of acidic electrolyte (1M HCl) containing chloramines, as produced in Example 4, was diluted to form a neutral solution. The following reaction equations, depending on the final pH, are expected to occur with increasing dilution:

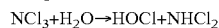

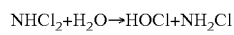

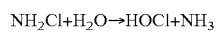

Thus, the neutralisation (and dilution) of the solution is expected to increase the amount of $NH_2Cl$ in the solution. Such solutions are directly useful for water disinfection or as fertilisers.

Figure 10:
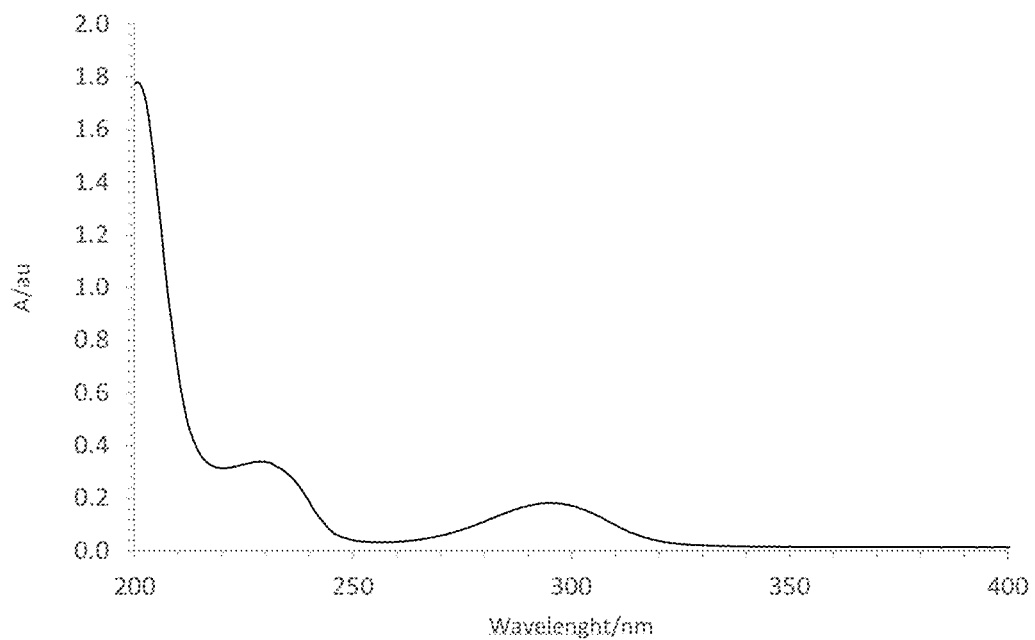
FIG. 10 is a UV-vis spectrum of the diluted product electrolyte produced in Examples 2 and 4, showing an increase in the speciation of NH$_2$Cl.

The UV-vis spectrum of the diluted solution is shown in FIG. 10. The absorption pattern it is in a good agreement with the literature reports for $NH_2Cl$ speciation at pH 6.

Example 6. Chloramine Separation

The nitrogen fixation products synthesised during Examples 2 and 4 can be retrieved via vapour-liquid equilibria (VLE) or solid-liquid equilibria (SLE) extraction processes.

The product of the reduction reaction in Example 4 was thus placed into a closed system comprising 30 ml of pure water in a separate container, and the system was heated to 100° C. for 12 h. After this time, analysis of the aqueous composition (previously pure water) by UV-vis spectroscopy revealed the characteristic peaks of the $NHCl_2$ product. The chlorine DPD test confirmed the presence of combined chlorine in the liquid sample. The results demonstrate the potential to separate the chloramine product by liquid vapour equilibrium.

To further validate this concept the following calculations were carried out. Chloramines at equilibrium are partitioned between the liquid and the vapour phase according to their saturated vapour pressure. In an aqueous electrolyte the vapour-liquid equilibria is described by Raoult's law (equation 23) and the activity can be reported as a function of the solute concentration and its activity coefficient (equation 24):

$$p_i = p_i^0 x_i \qquad (23)$$

$$a_i = \gamma_i c_i \qquad (24)$$

where $p_i$ is the vapour pressure of component i, $p_i^0$ the saturated vapour pressure of the pure component i at 25° C. and $x_i$ the molar fraction of component i, as the activity of component i, $\gamma_i$ the activity coefficient of component i and $c_i$ the concentration of component i.

Here the activity coefficient was calculated using COSMO-therm program (Version 18.0.0). The COSMO-RS calculations and basis set parameterisation were performed at the BP/TZVP level using the fully optimised geometries at the same level of theory, and parameter file BP TZVP_18.

Figure 11:
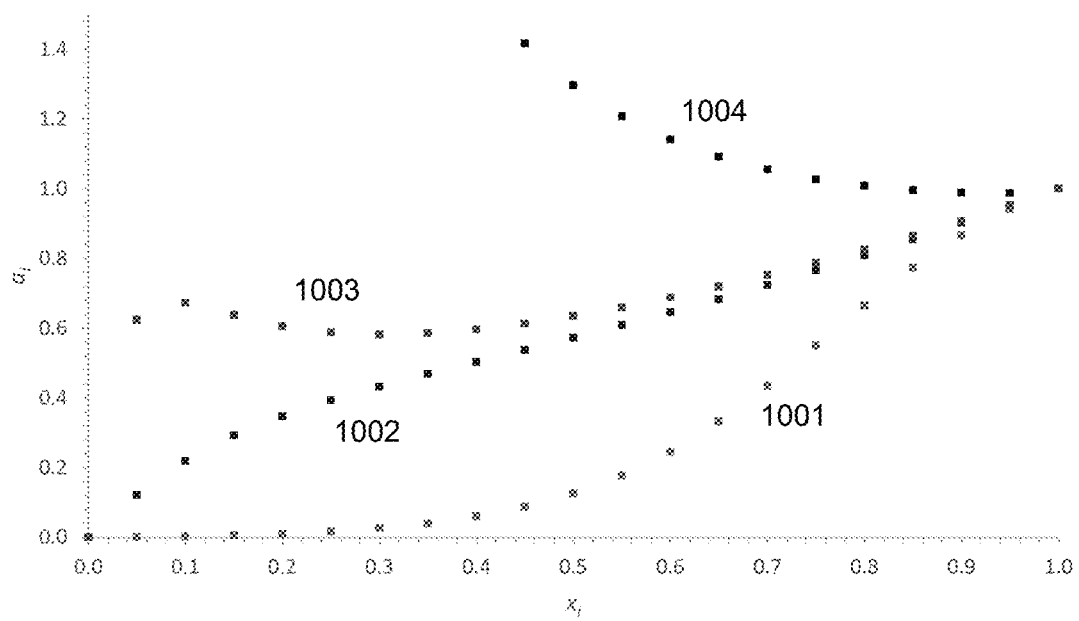
FIG. 11 shows calculated curves of activity as a function of mole fraction for aqueous solutions of ammonia and chloramines (NH$_2$Cl, NHCl$_2$ and NCl$_3$), as determined in Example 6.

The difference between the chloramines and ammonia as solute is described by the three calculated curves in FIG. 11. The negative deviation from Raoult's law of ammonia (curve 1001) indicates an intrinsic tendency of ammonia to remain in the liquid phase (i.e. to have low vapour pressure over the solution), while the positive deviation from Raoult's law for the three chloramine species (curves 1002, 1003 and 1004 for $NH_2Cl$, $NHCl_2$ and $NCl_3$ respectively) indicates a tendency to partition into the vapour phase (i.e. have a higher vapour pressure over the solution than expected from Raoult's law). The results thus indicate that the chloramines can partition into a vapour phase more easily than ammonia.

Example 7 (Comparative). Control Experiments at Open Circuit Potential (OCP)

An experiment was conducted as in Example 4, except that no potential or current was applied at the cathode. The electrolyte was extracted with organic solvents and analysed by UV-vis spectroscopy as described in Example 2. The results confirmed that peaks ascribed to chloramines were absent. Free and total chlorine quantified using the DPD colorimetric method were also undetectable in the mixture.

The same experiment was conducted at OCP except that an aqueous solution of sodium hypochlorite ($1 \times 10^{-4}$ litres, 0.2 mg·$L^{-1}$) was also added to the electrolyte. The electrolyte was extracted with organic solvents and analysed by UV-vis spectroscopy as described in Example 2, and again no chloramines were detected.

The results confirm that the formation of chloramines by reduction of ammonia is an electrocatalysed reaction requiring a reductive current.

Example 8. $^{15}N_2$ Tests

To confirm that the source of the chloramine product was $N_2$ and not some other source of nitrogen, a $^{15}N_2$ test was carried out using the methods of Examples 2 and 4. The gas mix was 0.6 bar $^{15}N_2$ and 0.4 bar $^{14}N_2$. The chronoamperometry was run for three hours. The NMR spectrum shows the signals expected for $^{15}NH_4^+$ and $^{14}NH_4^+$ in approximately the expected ratio of 60/40. The yields were, respectively 68 micromol and 54 micromol, indicating yield rates of $5.0 \times 10^{-9}$ and $6.3 \times 10^{-9}$ mol/cm²/s respectively. The sum of these indicates a yield rate of $1.1 \times 10^{-8}$ mol/cm²/s at an overall faradaic efficiency of 49%. These results are consistent with examples 3 and 4 within error, proving that the process is indeed reacting with $N_2$ gas to form chloramines.

Example 9. Reduction of $N_2$ to Chloramine on the Carbon-Supported Ruthenium Metal Electrode by Chronoamperometry at Neutral pH Chloramine formation at neutral pH was also investigated. The single compartment electrochemical cell was charged with an aqueous mixture of NaCl (1 mol $L^{-1}$, 5.0 mL) and $MgCl_2$ (3.2 E-02 mol $L^{-1}$, 25.0 mL) at room temperature (i.e. about 25° C.) and atmospheric pressure (i.e. about 101325 Pa) and neutral pH. The carbon-supported ruthenium metal cathode prepared in Example 1a, the Ag/AgCl SCE reference electrode and a platinised titanium dioxide anode (6 cm²) were immersed in the electrolyte. The cell was evacuated (10000 Pa) and back filled with dinitrogen gas at (1, 8 and 15 bar) pressure. An electrochemical reaction was immediately conducted for 3600, 10800, and 43200 s using a chronoamperometry method at constant potential of −0.95 V vs Ag/AgCl (−0.75 V vs RHE).

Figure 12:
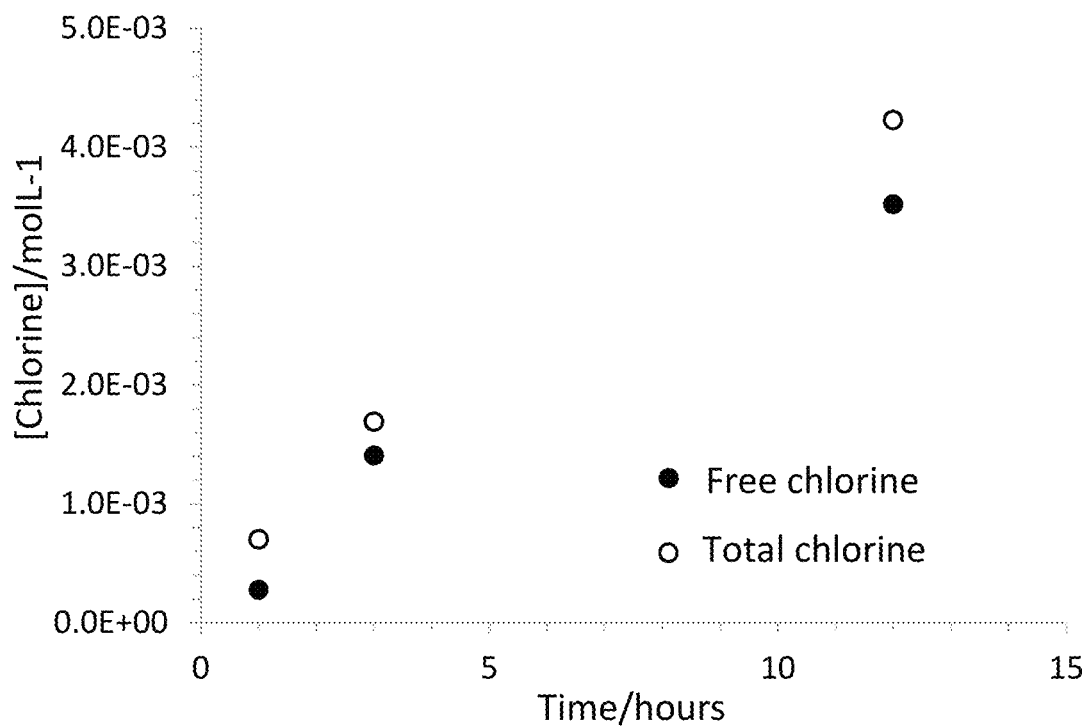
FIG. 12 shows the total chlorine and free chlorine measured as a function of electrolysis time when reducing dinitrogen to chloramines at neutral pH in Example 9.

The chloramine yield was initially detected after appropriate dilution in ultrapure water using HACH water quality test strips (Aquacheck®7 1236LBA R5/10, U.S. Pat. Nos. 6,030,842; 6,432,717), which determine the total chlorine and free chlorine, as seen in FIG. 12. The difference in the free and total chlorine is the combined chlorine, i.e. chloramines. The results demonstrate that chloramines are formed at neutral pH conditions where the free chlorine (i.e. the reducible source of chlorine formed at the anode) is expected to be at least partly in the form of OCl⁻ (pKa of HOCl=7.5) and the source of hydrogen is expected to be $H_2O$.

The chloramine yield was further detected via conversion to ammonium, analysing by ¹H NMR using maleic acid as an internal standard. The electrolyte was first diluted in HCl 32% in a 1:2 ratio and subsequently diluted 1:50 in water for the NMR quantification. The quantitative conversion of chloramines to ammonium was detected over an incubation time of up to 15 days and a steady state ammonium concentration was reached after 7 days of incubation.

Figure 13:
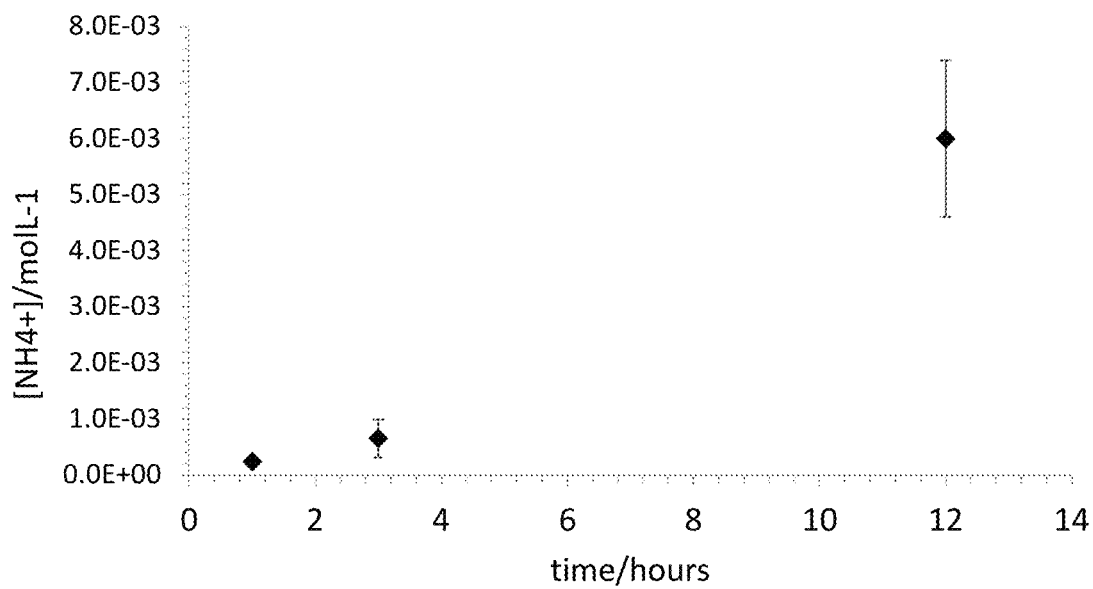
FIG. 13 shows the concentration of ammonia present in the electrolyte, after converting chloroamines to ammonia, as a function of electrolysis time when reducing dinitrogen to chloramines at neutral pH in Example 9.
Figure 14:
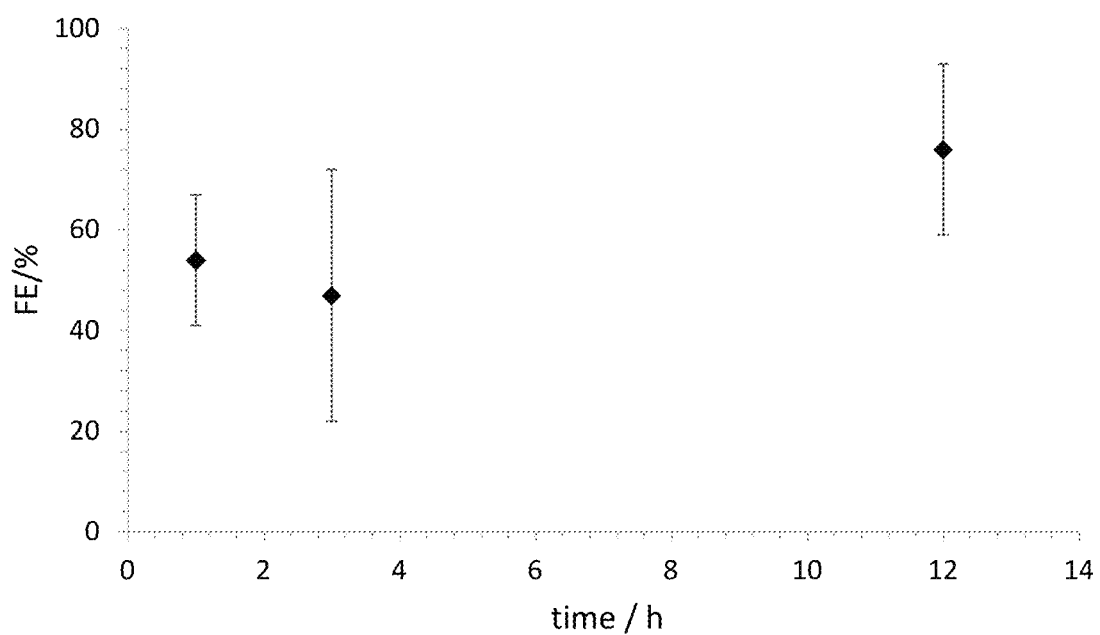
FIG. 14 shows the calculated faradaic efficiency of dinitrogen to chloramines as a function of electrolysis time when reducing dinitrogen to chloramines at neutral pH in Example 9.

The concentration of ammonia and the calculated faradic efficiency as a function of time are shown in FIGS. 13 and 14 respectively. The faradaic efficiency was approximately constant in time and the amount of ammonia detected increased approximately linearly after an apparent induction time of approximately 30 minutes at the beginning of each experiment. The averaged reaction yield rate for formation of chloramine (normalised to the electrocatalytic surface area of the cathode) was thus calculated to be $2.6 \times 10^{-9} \pm 0.8 \times 10^{-9}$ mol cm⁻² s⁻¹. The faradaic efficiency for chloramine production in this process was calculated to be 59±18%.

Example 10 (Comparative). Control Experiment with Ar Instead of $N_2$

An electrochemical cell was set up as described in Example 9 but filled with Ar (15 bar and 25° C.) instead of N$_2$. An electrochemical reaction was immediately conducted for 3600 s using a chronoamperometry method at constant potential of −0.85 V vs Ag/AgCl (−0.75 V vs RHE). The concentration of chloramine product was again detected via $^1$H NMR analysis, as described in Example 9. Approximately 0.038×10$^{-3}$ mol/L of NH$_4^+$ was detected. This is an insignificant amount compared to that detected in the 12 hour N$_2$ experiment of Example 9 (c.f. FIG. 13), indicating that the electrolyte and cell components are not a substantial source of NH$_4^+$ in Example 9.

Example 11 (Comparative). Control Experiment with Anode Compartment Separated from the Cathode An experiment was carried out according to the conditions of Example 4, except that the experiment was carried out in an H-cell in which the anode and cathode compartments are separated by a glass frit which limits mixing of the contents of the two compartments. The ammonia yield detected after 1 h of electrolysis followed by oxidation/$^1$H NMR analysis as per Example 4 was not significantly different from background levels. By separation of the cathode and anode compartments, hypochlorite transfer to the cathode compartment was negligible and chloramine was thus not formed. This experiment demonstrates that chloramines are not inherently formed during N$_2$ reduction in chloride-based electrolytes unless (i) chloride is oxidised at the anode to form a reducible source of chlorine (i.e. HOCl or OCl$^-$) and (ii) the reducible source of chlorine is transported to the cathode for reaction.

Example 12. Independent Addition of Hypochlorite to the Cathode Chamber

To confirm that hypochlorite is the active agent in Examples 1-9, a dinitrogen reduction experiment similar to example 9 was carried out using an H-cell with a separator to effectively isolate the cathode from the anode. During electrolysis at 1.1 mA/cm$^2$ for 1 hour, sodium hypochlorite (NaOCl) solution was added to the cathode chamber to give a concentration of 18.5 ppm, this being sufficient to form monochloramine from the expected yield of reduced nitrogen species at 70% faradaic efficiency. The product was analysed using HACH water quality test strips as total chlorine and free chlorine, as per Example 9. The total chlorine determined was 15 ppm, indicating that some of the added hypochlorite had been consumed by direct reduction at the cathode. The combined chlorine determined was 10 ppm. On the basis that this product was predominantly monochloramine, a yield rate of monochloramine of 1.3×10$^{-9}$ mol cm$^{-2}$ s$^{-1}$ was thus calculated. This experiment (together with Example 11) confirms that hypochlorite is the chlorinating agent in haloamine formation (and not chloride), and that an external (e.g. recycled) source of hypochlorite may be added as the source of reducible chlorine when reducing dinitrogen to produce haloamines.

Example 13. Production of Bromo-Amines

An experiment was carried out as described in Example 9, but with a 0.5 M NaBr electrolyte. After 1 h of electrolysis at 1 mA/cm$^2$, the solution was analysed by UV-vis spectroscopy, exhibiting a peak in the region 260-270 nm; A(261 nm)=0.26. NH$_2$Br absorbs strongly in this region ($\lambda$max=279 nm, $\varepsilon$=395 M$^{-1}$cm$^{-1}$, $\varepsilon$(261 nm)=305 M$^{-1}$cm$^{-1}$), as does NHBr$_2$ ($\lambda$max=232 nm, $\varepsilon$=2090 M$^{-1}$cm$^{-1}$, $\varepsilon$(261 nm)=1110 M$^{-1}$cm$^{-1}$ (Wajon et al Inorg Chem 21 4258-4263, 1982). HOBr also absorbs in this region ($\lambda$max=261 nm, $\varepsilon$=85 M$^{-1}$cm$^{-1}$), but from Faraday's law the maximum absorption that could be expected from HOBr in this measurement if only HOBr was produced is A=0.052. Hence at least A=0.2 can be attributed to the presence of bromo-amines.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A method of reducing dinitrogen to produce at least one haloamine compound, the method comprising:
   contacting a cathode comprising a dinitrogen-activating electrocatalytic composition with an electrolyte;
   providing dinitrogen, a reducible source of halogen and a source of hydrogen for reaction at the cathode; and
   applying a potential at the cathode sufficient to reduce the dinitrogen on the dinitrogen-activating electrocatalytic composition in the presence of the reducible source of halogen and the source of hydrogen, thereby producing at least one haloamine compound.

2. The method according to claim 1, wherein the reducible source of halogen and the source of hydrogen are provided in the electrolyte for reaction at the cathode.

3. The method according to claim 1, wherein the halogen is chlorine and the at least one haloamine compound comprises at least one selected from the group consisting of NCl$_3$, NHCl$_2$ and NH$_2$Cl.

4. The method according to claim 1, wherein the reducible source of halogen comprises at least one selected from the group consisting of hypochlorite anion (OCl$^-$), hypochlorous acid (HOCl) and dichlorine (Cl$_2$).

5. The method according to claim 1, wherein the potential is in the range of +250 mV to −500 mV relative to the reversible hydrogen electrode (RHE).

6. The method according to claim 1, wherein the reducible source of halogen is dissolved in the electrolyte at a concentration of at least 1×10$^{-5}$ mol/litre.

7. The method according to claim 1, wherein the electrolyte is an acidic aqueous electrolyte.

8. The method according to claim 1, wherein the electrolyte comprises a solution of halide.

9. The method according to claim 8, wherein the halide concentration is at least 0.05 mol/litre.

10. The method according to claim 1, further comprising producing the reducible source of halogen by oxidising a halide anion in the electrolyte at an anode, wherein the reducible source of halogen is transported in the electrolyte from the anode for reaction with the reduced dinitrogen.

11. The method according to claim 10, wherein the halide anion is oxidised at the anode to produce the reducible source of halogen with a faradaic efficiency of at least 20%.

12. The method according to claim 1, further comprising introducing an external feed to an electrochemical cell comprising the cathode, wherein the external feed comprises at least a portion of the reducible source of halogen provided for reaction at the cathode.

13. The method according to claim 1, wherein the dinitrogen-activating electrocatalytic composition comprises a metallic composition.

14. The method according to claim 13, wherein the metallic composition is in the form of micro- and/or nanoparticles.

15. The method according to claim 1, further comprising dissolving the dinitrogen in the electrolyte by contacting the electrolyte with dinitrogen gas at a partial pressure of between 0.7 bar and 100 bar.

16. The method according to claim 1, wherein the dinitrogen is converted to the at least one haloamine compound with a faradaic efficiency of at least 40%.

17. The method according to claim 1, wherein the at least one haloamine compound is produced in an electrochemical cell and wherein the method further comprises recovering a product composition comprising the at least one haloamine compound from the electrochemical cell, wherein the product composition is an acidic aqueous composition and the haloamine compound is a chloramine compound, and wherein the method further comprises neutralising or diluting the acidic aqueous composition to increase a concentration of $NH_2Cl$ therein.

18. The method according to claim 1, wherein the at least one haloamine compound is produced in an electrochemical cell and wherein the method further comprises recovering a product composition comprising the at least one haloamine compound from the electrochemical cell, wherein
the method further comprises concentrating the product composition to produce a concentrated composition of haloamine compound.

19. The method according to claim 1, further comprising separating the haloamine compound from the electrolyte by partitioning the haloamine compound into a gas phase.

20. The method according to claim 1, wherein the at least one haloamine compound is produced in an electrochemical cell and wherein the method further comprises recovering a product composition comprising the at least one haloamine compound from the electrochemical cell,
wherein the product composition is an aqueous composition and the method further comprises extracting the haloamine compound from the aqueous composition into a non-aqueous solvent.

21. A method of producing ammonia or an ammonium salt from dinitrogen, the method comprising:
contacting a cathode comprising a dinitrogen-activating electrocatalytic composition with an electrolyte;
providing dinitrogen, a reducible source of halogen and a source of hydrogen for reaction at the cathode;
applying a potential at the cathode sufficient to reduce the dinitrogen on the dinitrogen-activating electrocatalytic composition in the presence of the reducible source of halogen and the source of hydrogen, thereby producing at least one haloamine compound; and
converting the at least one haloamine compound to ammonia or an ammonium salt.

22. The method according to claim 21, wherein the converting comprises hydrolysing the at least one haloamine compound with an acid and removing a reducible source of halogen produced as a by-product of the hydrolysing.

* * * * *